United States Patent
Mizoguchi

(10) Patent No.: US 11,640,459 B2
(45) Date of Patent: May 2, 2023

(54) ABNORMALITY DETECTION DEVICE

(71) Applicant: NEC Corporation, Tokyo (JP)

(72) Inventor: Takehiko Mizoguchi, Tokyo (JP)

(73) Assignee: NEC CORPORATION, Tokyo (JP)

( * ) Notice: Subject to any disclaimer, the term of this patent is extended or adjusted under 35 U.S.C. 154(b) by 106 days.

(21) Appl. No.: 17/255,518

(22) PCT Filed: Jun. 28, 2018

(86) PCT No.: PCT/JP2018/024682
§ 371 (c)(1),
(2) Date: Dec. 23, 2020

(87) PCT Pub. No.: WO2020/003460
PCT Pub. Date: Jan. 2, 2020

(65) Prior Publication Data
US 2021/0224383 A1     Jul. 22, 2021

(51) Int. Cl.
*G06F 21/55*      (2013.01)
*G06F 21/54*      (2013.01)
*G06F 21/56*      (2013.01)

(52) U.S. Cl.
CPC ............ *G06F 21/552* (2013.01); *G06F 21/54* (2013.01); *G06F 21/554* (2013.01); *G06F 21/566* (2013.01)

(58) Field of Classification Search
CPC .... G06F 21/552; G06F 21/554; G06F 21/566; G06F 21/54; G06F 2221/034; G06F 2221/2115; G06F 11/30
See application file for complete search history.

(56) References Cited

U.S. PATENT DOCUMENTS 9,646,159 B2 *   5/2017   Langton ................ G06F 21/567
10,140,836 B2 *   11/2018   Takahashi ............ G08B 21/187
(Continued)

FOREIGN PATENT DOCUMENTS

JP     2011-070635 A     4/2011
JP     2015-028700 A     2/2015
(Continued)

OTHER PUBLICATIONS

International Search Report for PCT Application No. PCT/JP2018/024682, dated Sep. 25, 2018.

*Primary Examiner* — Christopher A Revak
(74) *Attorney, Agent, or Firm* — Sughrue Mion, PLLC

(57) ABSTRACT

A first anomaly detection unit detects anomalous first monitored data from among a plurality of first monitored data obtained from a monitored system. A second anomaly detection unit operates in parallel with the first anomaly detection unit and detects anomalous second monitored data from among a plurality of second monitored data obtained from the monitored system. In a first storage unit, the anomalous first monitored data and the anomalous second monitored data detected before lapse of a given time from detection time of the anomalous first monitored data are stored in association with each other. A first determination unit, when the anomalous first monitored data is detected, retrieves the anomalous second monitored data associated with the detected anomalous first monitored data from the first storage unit and outputs a first anomaly detection result including the retrieved anomalous second monitored data and the detected anomalous first monitored data.

11 Claims, 13 Drawing Sheets

(56) References Cited

U.S. PATENT DOCUMENTS

| | | | |
|---|---|---|---|
| 2012/0278663 A1 | 11/2012 | Hasegawa | |
| 2012/0290879 A1 | 11/2012 | Shibuya et al. | |
| 2016/0164721 A1* | 6/2016 | Zhang | H04L 41/142 709/224 |
| 2018/0046529 A1 | 2/2018 | Togawa | |
| 2018/0183661 A1* | 6/2018 | Wouhaybi | H04L 67/12 |
| 2019/0042744 A1* | 2/2019 | Rajasekharan | G06F 21/554 |
| 2020/0183805 A1 | 6/2020 | Togawa | |

FOREIGN PATENT DOCUMENTS

| | | |
|---|---|---|
| JP | 2017-084106 A | 5/2017 |
| WO | 2011/083687 A1 | 7/2011 |
| WO | 2016/132717 A1 | 8/2016 |
| WO | 2018/069950 A1 | 4/2018 |

* cited by examiner

FIG. 3

| FIRST SENSOR ID | SECOND SENSOR ID | MATHEMATICAL FORMULA |
|---|---|---|
| 1 | 2 | $y_2 = f_1(X_1)$ |
| 5 | 6 | $y_6 = f_2(X_5)$ |
| ⋮ | ⋮ | ⋮ |

FIG. 4

| SENSOR ID PAIR | DETECTION TIME | ANOMALOUS LOG DATA |
|---|---|---|
| 1,2 | $t_1$ | LOG DATA A |
| 5,6 | $t_2$ | LOG DATA B |
| ⋮ | ⋮ | ⋮ |

FIG. 7

| ANOMALOUS DATA | PATTERN | COLLECTION TIME | SENSOR ID PAIR | DETECTION TIME |
|---|---|---|---|---|
| LOG DATA X | PX | $t_{11}$ | 11, 12 | $t_{21}$ |
| LOG DATA Y | PY | $t_{12}$ | 15, 16 | $t_{22}$ |
| ⋮ | ⋮ | ⋮ | ⋮ | ⋮ |

ABNORMALITY DETECTION DEVICE

This application is a National Stage Entry of PCT/JP2018/024682 filed on Jun. 28, 2018, the contents of all of which are incorporated herein by reference, in their entirety.

TECHNICAL FIELD

The present invention relates to an anomaly detection device, an anomaly detection method, and a computer-readable recording medium.

BACKGROUND ART

When an anomaly occurs in equipment or a system, it is important to immediately detect the occurring anomaly. Various anomaly detection methods for that purpose have been proposed.

For example, in Patent Document 1, by collecting the measured values of a plurality of performance indexes such as CPU usage rate and memory usage as monitored data from a monitored system such as a Web server, and comparing the collected measured values of the performance indexes with measured values at normal time, an anomalous performance index is detected as an anomalous item.

Further, in Patent Document 2, by collecting a system log as monitored data from a monitored system such as a Web server, and comparing the collected system log with a system log at normal time, an anomalous system log is detected. Moreover, in Patent Document 2, in parallel with anomaly detection based on a system log, anomaly by collecting SNS information as monitored data, detection based on a negative tweet is performed. When anomalies exist in both the monitored data, it is determined that a failure has occurred. Then, in Patent Document 2, by comparing the word appearance distribution of a system log in which an anomaly has been detected previously with the word appearance distribution of a system log in which an anomaly has been detected currently, it is determined whether or not the failure having occurred is a silent failure.

Patent Document 1: International Publication WO2011/083687

Patent Document 2: Japanese Unexamined Patent Application Publication No. JP-A 2015-028700

As described above, there are various types of monitored data used to detect an anomaly in a monitored system. For example, in Patent Document 1, the measured values of performance indexes such as CPU usage rate and memory usage is used as monitored data. Moreover, for example, in Patent Document 2, a system log is used as monitored data, and SNS information is also used as monitored data. In general, each monitored data has an advantage and a disadvantage. For example, anomaly detection using a system log has an advantage that it is easy to identify the cause of an anomaly. However, it is more difficult in anomaly detection using a system log to early detect an anomaly in a monitored system such as a plant in which an anomalous log is output after an anomaly occurs in the measured values of performance indexes, than in anomaly detection using the measured values of performance indexes. On the other hand, anomaly detection using the measured values of performance indexes has an advantage that it is possible to detect an anomaly before anomaly detection using a system log is performed in a monitored system such as a plant, but it is difficult to identify the cause of the anomaly.

In view of the above, in order to comprehensively determine an anomaly occurring in a monitored system, it is desirable to detect anomalies of a plurality of monitored data of different types. However, as seen in the abovementioned monitored system such as a plant, timings at which anomalies are detected in the respective monitored data are different. That is to say, in a monitored system such as a plant, an anomaly is first detected in the measured values of performance indexes and then an anomaly is detected in a system log after a while. Therefore, in the configuration of simply detecting anomalies of a plurality of monitored data as described in Patent Document 2, it takes a long time before all the anomalies of a plurality of monitored data are detected after an anomaly occurs. As a result, it becomes difficult to make a comprehensive determination at early stage by using anomalies of a plurality of monitored data in combination.

SUMMARY

An object of the present invention is to provide an anomaly detection device which solves the abovementioned problem that it is impossible to make a comprehensive determination at early stage by using anomalies of a plurality of monitored data in combination.

An anomaly detection device according to an aspect of the present invention1 includes: a first anomaly detection unit configured to detect anomalous first monitored data from among a plurality of first monitored data obtained from a monitored system; a second anomaly detection unit configured to operate in parallel with the first anomaly detection unit and detect anomalous second monitored data from among a plurality of second monitored data obtained from the monitored system; a first storage unit configured to have the anomalous first monitored data and the anomalous second monitored data stored therein in association with each other, the anomalous second monitored data having been detected before lapse of a given time from detection time of the anomalous first monitored data; and a first determination unit configured to, when the anomalous first monitored data is detected, retrieve the anomalous second monitored data associated with the detected anomalous first monitored data from the first storage unit and output a first anomaly detection result including the retrieved anomalous second monitored data and the detected anomalous first monitored data.

Further, an anomaly detection method according to another aspect of the present invention includes: detecting anomalous first monitored data from among a plurality of first monitored data obtained from a monitored system; in parallel with detecting the anomalous first monitored data, detecting anomalous second monitored data from among a plurality of second monitored data obtained from the monitored system; and when the anomalous first monitored data is detected, retrieving the anomalous second monitored data associated with the detected anomalous first monitored data from a first storage unit in which the anomalous first monitored data and the anomalous second monitored data having been detected before lapse of a given time from detection time of the anomalous first monitored data are stored in association with each other, and outputting a first anomaly detection result including the retrieved anomalous second monitored data and the detected anomalous first monitored data.

Further, a non-transitory computer-readable recording medium according to another aspect of the present invention has a program stored thereon. The program includes instructions for causing a computer to function as: a first anomaly detection unit configured to detect anomalous first monitored data from among a plurality of first monitored data obtained from a monitored system; a second anomaly detection unit configured to operate in parallel with the first anomaly detection unit and detect anomalous second monitored data from among a plurality of second monitored data obtained from the monitored system; a first storage unit configured to have the anomalous first monitored data and the anomalous second monitored data stored therein in association with each other, the anomalous second monitored data having been detected before lapse of a given time from detection time of the anomalous first monitored data; and a first determination unit configured to, when the anomalous first monitored data is detected, retrieve the anomalous second monitored data associated with the detected anomalous first monitored data from the first storage unit and output a first anomaly detection result including the retrieved anomalous second monitored data and the detected anomalous first monitored data.

With the configurations described above, the present invention enables an early comprehensive determination by using anomalies of a plurality of monitored data in combination.

BRIEF DESCRIPTION OF DRAWINGS

FIG. 3 is a view showing an example of a content of a first model in the anomaly detection device according to the first example embodiment of the present invention;

FIG. 4 is a view showing an example of data stored in a storage unit in the anomaly detection device according to the first example embodiment of the present invention;

FIG. 7 is a view showing an example of data stored in a storage unit in the anomaly detection device according to the second example embodiment of the present invention;

EXAMPLE EMBODIMENTS

First Example Embodiment

Figure 1:
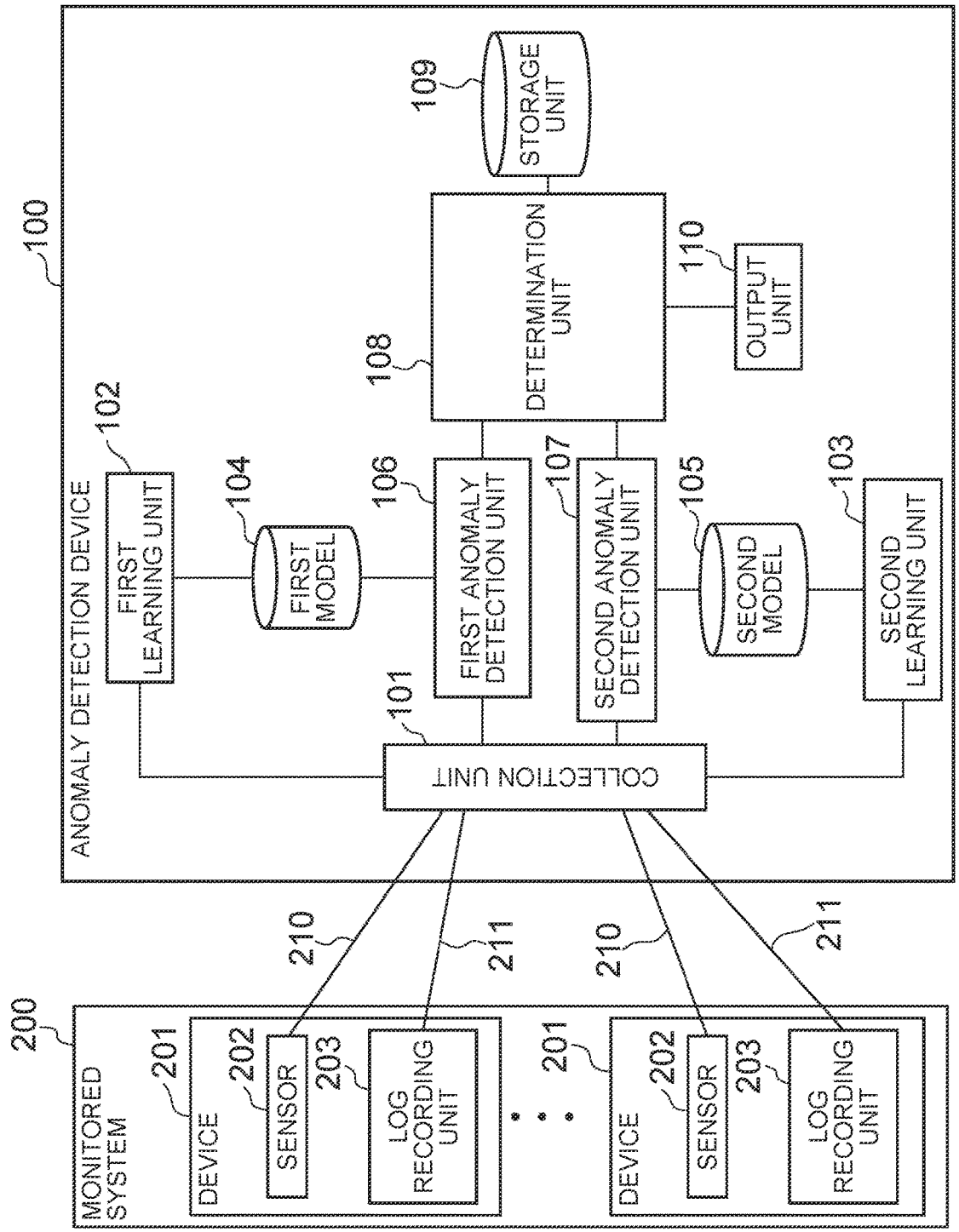
FIG. 1 is a block diagram of an anomaly detection device according to a first example embodiment of the present invention.

FIG. 1 is a block diagram of an anomaly detection device 100 according to a first example embodiment of the present invention. Referring to FIG. 1, the anomaly detection device 100 is connected to a monitored system 200 through a communication channel or a network by wired or wireless connection.

The monitored system 200 is a system which is the target of anomaly detection. In this example embodiment, the monitored system 200 is a plant system or the like in which, when an anomaly occurs, an anomaly first occurs in a measured value by a sensor and thereafter an anomalous log is output. Examples of a plant system include a power plant, a chemical plant, a water treatment plant, an oil plant, and the like. The monitored system 200 includes a plurality of devices 201. In a case where the monitored system 200 is a plant system, the devices 201 are, for example, plant facilities such as a boiler, a turbine, a power generation device, and a control computer. However, the monitored system 200 is not limited to a plant system.

The device 201 includes a sensor 202 that measures the measured value of each measurement item of the device 201. A measurement item by the sensor 202 is, for example, temperature, pressure, flow rate, and so on. The sensor 202 outputs sensor data 210. The sensor data 210 includes, for example, a sensor ID that uniquely identifies the sensor 202, the measured value of a measurement item, and a timestamp indicating the measurement time. A measurement item is also referred to as a performance index. The measured value of a measurement item is also referred to as performance information.

Further, the device 201 includes a log recording unit 203 that outputs log data 211 in text format. The log data 211 includes, for example, a text message showing the operation status and operation history of the device 201, and a timestamp indicating the collection time. Log data is also referred to as text log or event information.

The anomaly detection device 100 is a device that detects an anomaly in the monitored system 200. The anomaly detection device 100 is configured to detect an anomaly in the monitored system 200 based on the sensor data 210 of the sensor 202 and the log data 211 of the log recording unit 203. The anomaly detection device 100 includes a collection unit 101, a first learning unit 102, a second learning unit 103, a first model 104, a second model 105, a first anomaly detection unit 106, a second anomaly detection unit 107, a determination unit 108, a storage unit 109, and an output unit 110.

The collection unit 101 is configured to regularly collect the sensor data 210 from the monitored system 200. For example, the collection unit 101 collects the sensor data 210 every one minute for each sensor 202. Data in which measured values in the regularly collected sensor data 210 of the sensor 202 are arranged in time series is referred to as time-series data of the sensor 202. Time-series data is for each sensor 202. Moreover, the collection unit 101 collects the log data 211 from the monitored system 200 in real time. The collection unit 101 is configured to supply the collected sensor data 210 to the first learning unit 102 and the first anomaly detection unit 106. Moreover, the collection unit 101 is configured to supply the collected log data 211 to the second learning unit 103 and the second anomaly detection unit 107.

The first learning unit 102 is configured to automatically extract an invariant correlation existing between the time-series data of the sensor data 210 based on the sensor data 210 supplied from the collecting unit 101 during normal operation of the monitored system 200. Time-series data of the sensor data during normal operation is also referred to as normal time-series data. Moreover, the first learning unit 102 is configured to express the extracted correlation by a mathematical formula and store model data including the mathematical formula as the first model 104. A mathematical formula expressing the correlation can be, for example, in the form of y=f(X). This formula defines a measured value y of one sensor data as a function of a measured value X of the other sensor data. The degree and constant term of the function f(X) are determined so that the value of the measured value y can be accurately obtained from the value of the measured value X. A mathematical formula is also referred to as a prediction formula.

Figure 2:
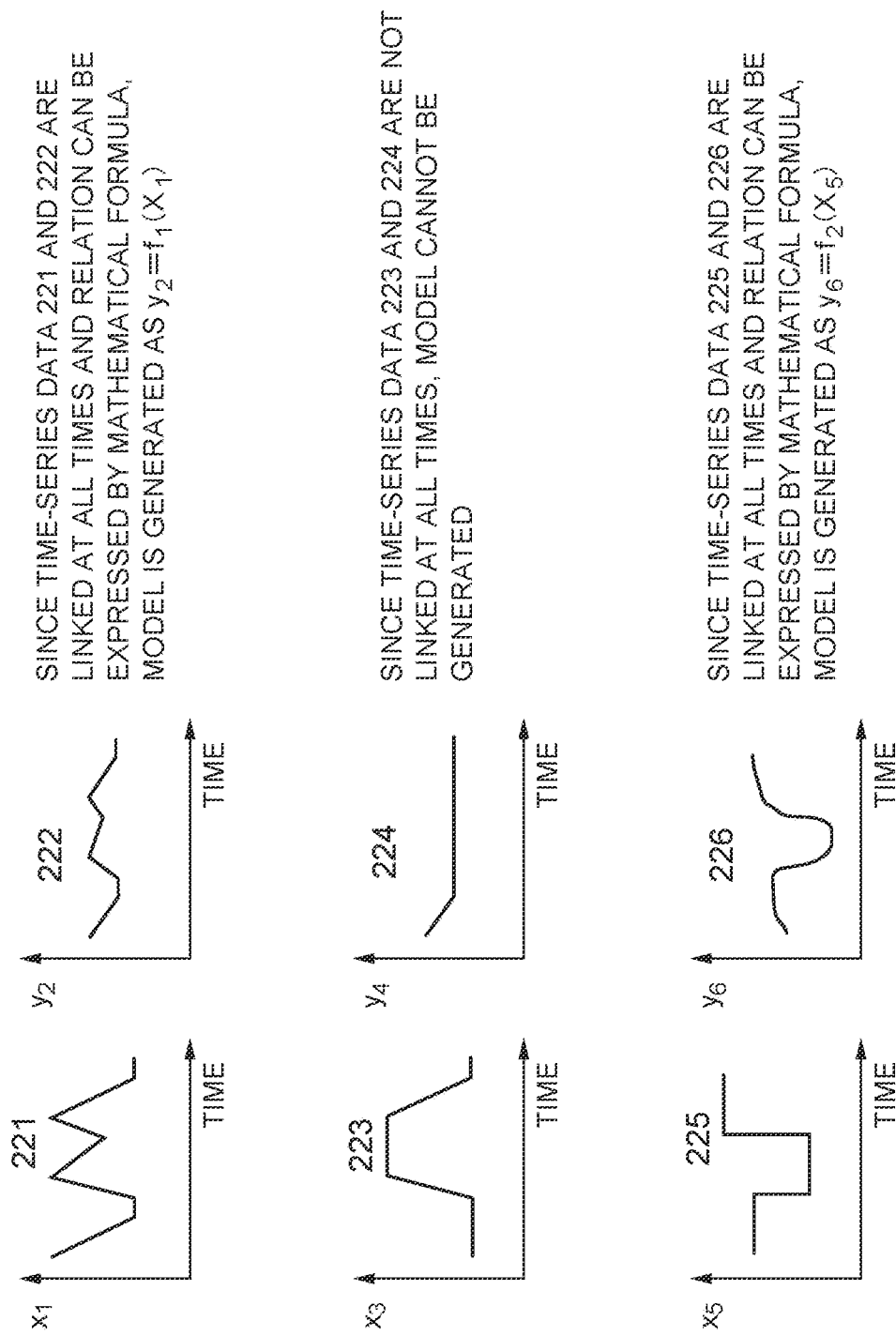
FIG. 2 is a concept view describing an operation of a first learning unit in the anomaly detection device according to the first example embodiment of the present invention.

FIG. 2 is a concept view describing an operation of the first learning unit 102. In the figure, the vertical axis of a graph shows the measured value of a sensor, and the horizontal axis shows time. Of the two graphs on the top row, the left one shows time-series data 221 of a sensor with sensor ID=1, and the right one shows time-series data 222 of a sensor with sensor ID=2. Since the two are linked at all times and the correlation can be expressed by a mathematical formula, the first learning unit 102 creates model data including a mathematical formula $y_2=f_1(X_1)$ from these two time-series data 221 and 222. The subscript "1" of X and the subscript "2" of y in the formula represent the sensor IDs. That is to say, $X_1$ is the measured value of the sensor with sensor ID=1, and $y_2$ is the measured value of the sensor with sensor ID=2. Of the two graphs on the middle row, the left one shows time-series data 223 of a sensor with sensor ID=3, and the right one shows time-series data 224 of a sensor with sensor ID=4. Since the two are not linked at all times, the first learning unit 102 does not create model data from these two time-series data 223 and 224. Of the two graphs on the bottom row, the left one shows time-series data 225 of a sensor with sensor ID=5, and the right one shows time-series data 226 of a sensor with sensor ID=6. Since the two are linked at all times and the correlation can be expressed by a mathematical formula, the first learning unit 102 creates model data including a mathematical formula $y_6=f_2(X_5)$ from these two time-series data 225 and 226.

FIG. 3 shows an example of a content of the first model 104. The first model 104 includes a plurality of entries each having model data stored therein. Model data includes a first sensor ID, a second sensor ID, and a mathematical formula. For example, model data that includes first sensor ID=1, second sensor ID=2, and mathematical formula $y_2=f_1(X_1)$ representing an invariant correlation existing between the measured value $X_1$ of the sensor with first sensor ID and the measured value $y_2$ of the sensor with second sensor ID.

The first anomaly detection unit 106 is configured to detect whether or not an invariant correlation existing between time-series data of the sensor data 210 supplied from the collection unit 101 has been destroyed during operation of the monitored system 200. To be specific, the first anomaly detection unit 106 executes the following processing on each model data registered in the first model 104.

First, the first anomaly detection unit 106 calculates the measured value y of the sensor with second sensor ID by substituting the measured value X of the sensor with first sensor ID obtained by actual measurement into the mathematical formula. Next, the first anomaly detection unit 106 compares the calculated value of y with the measured value of the sensor with second sensor ID obtained by actual measurement, and calculates the amount of deviation between the two values. Next, the first anomaly detection unit 106 compares the calculated amount of deviation with a threshold value. When the amount of deviation is equal to or more than the threshold value, the first anomaly detection unit 106 determines that the correlation has been destroyed. When the amount of deviation is less than the threshold value, the first anomaly detection unit 106 determines that the correlation has not been destroyed. When determining that the correlation has been destroyed, the first anomaly detection unit 106 outputs a first anomaly detection result to the determination unit 108. A first anomaly detection unit includes, for example, a pair of the sensor IDs (first sensor ID and second sensor ID) with correlation having been destroyed, the time when destruction of the correlation has been detected, and time-series data of both the sensors.

For example, with respect to the model data stored in the entry on the first row of FIG. 3, the first anomaly detection unit 106 substitutes the measured value $X_1$ of the sensor with sensor ID=1 into the function $f_1(X_1)$ and calculates the measured value $y_2$ of the sensor with sensor ID=2. Next, the first anomaly detection unit 106 compares the calculated value of $y_2$ with the measured value y of the sensor with sensor ID=2 obtained by actual measurement, and calculates the amount of deviation Δ between the two values. Next, the first anomaly detection unit 106 compares the amount of deviation Δ with a threshold value TH. When the amount of deviation Δ is equal to or more than the threshold value TH, the first anomaly detection unit 106 determines that the correlation has been destroyed. When the amount of deviation Δ is less than the threshold value TH, the first anomaly detection unit 106 determines that the correlation has not been destroyed. In the case of determining that the correlation has been destroyed, the first anomaly detection unit 106 outputs, to the determination unit 108, a first anomaly detection result including the pair of sensor ID=1 and sensor ID=2, the time t when destruction of the correlation is detected, and time-series data of both the sensors.

The second learning unit 103 is configured to extract a log pattern from the log data 211 supplied from the collection unit 101 during normal operation of the monitored system 200, and store the extracted log pattern as the second model 105. Log data during normal operation is also referred to as normal log data or normal text log. A log pattern is, for example, a pattern such as a log format and a range (the type of a variable, the range of a value) that a variable part can take. A log pattern is also referred to as a log feature value.

The second anomaly detection unit 107 is configured to, during operation of the monitored system 200, extract a log pattern from the log data 211 supplied from the collection unit 101, and compare the extracted log pattern with the log pattern stored in the second model 105. Moreover, the second anomaly detection unit 107 is configured to, in a case where a log pattern extracted from the log data 211 supplied from the collection unit 101 during operation of the monitored system 200 does not match any of the log patterns stored in the second model 105, output a second anomaly detection result including the log data 211 as anomalous log data to the determination unit 108.

The storage unit 109 is configured so that a sensor ID pair that an anomaly is detected by the first anomaly detection unit 106 (a pair of IDs of two sensors that destruction of an invariant correlation between time-series data is detected), the detection time, and log data (anomalous log data) that an anomaly is detected by the second anomaly detection unit 107 before the lapse of a given time from the detection time are stored in association with each other. The storage unit 109 is referred to and updated by the determination unit 108. In the storage unit 109 in the initial state, significant data is not recorded.

FIG. 4 shows an example of data stored in the storage unit 109. The storage unit 109 has a plurality of entries. Each entry includes a sensor ID pair, the detection time, and anomalous log data. For example, in the entry on the first row, log data A is recorded in association with the pair of sensor ID=1 and sensor ID=2 and the detection time t1.

The determination unit 108 is configured to generate a third anomaly detection result by making a comprehensive determination based on the results of detection by the first anomaly detection unit 106 and the second anomaly detection unit 107.

Figure 5:
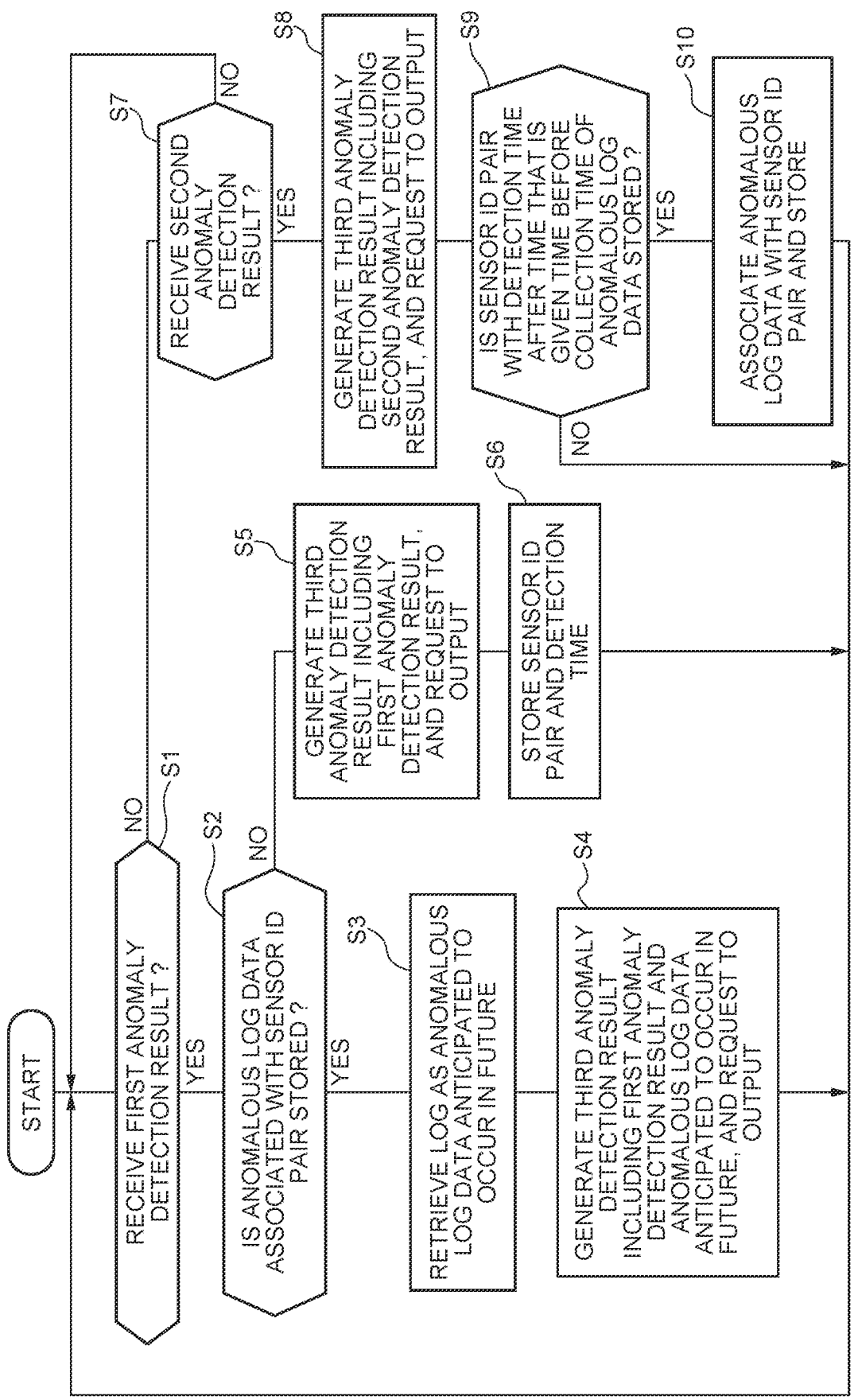
FIG. 5 is a flowchart showing an example of processing by a determination unit in the anomaly detection device according to the first example embodiment of the present invention.

FIG. 5 is a flowchart showing an example of processing by the determination unit 108. Referring to FIG. 5, the determination unit 108 first determines whether or not it receives a first anomaly detection result from the first anomaly detection unit 106 (step S1). In the case of receiving a first anomaly detection result (YES at step S1), the determination unit 108 checks whether or not anomalous log data associated with a sensor ID pair in the first anomaly detection result is stored in the storage unit 109 (step S2). In a case where associated anomalous log data is stored in the storage unit 109 (YES at step S2), the determination unit 108 retrieves the associated anomalous log data as anomalous log data anticipated to occur in the future from the storage unit 109 (step S3). Next, the determination unit 108 creates a third anomaly detection result including the first anomaly detection result and the anomalous log data anticipated to occur in the future, transmits the third anomaly detection result to the output unit 110, and requests for output of the third anomaly detection result (step S4). Then, the determination unit 108 returns to step S1 and repeats the same processing as the abovementioned processing.

In a case where associated anomalous log data is not stored in the storage unit 109 (NO at step S2), the determination unit 108 creates a third anomaly detection result including the first anomaly detection result, transmits the third anomaly detection result to the output unit 110, and requests for output of the third anomaly detection result (step S5). Next, the determination unit 108 registers the sensor ID pair and detection time included in the first anomaly detection result into the storage unit 109 (step S6). To be specific, at step S6, the determination unit 108 registers the sensor ID pair and detection time included in the first anomaly detection result into the sensor ID pair field and the detection time field of one vacant entry in the storage unit 109, and leaves the anomalous log data field NULL. Then, the determination unit 108 returns to step S1 and repeats the same processing as the abovementioned processing.

Further, the determination unit 108 determines whether or not it receives a second anomaly detection result from the second anomaly detection unit 107 (step S7). In the case of not receiving a second anomaly detection result (NO at step S7), the determination unit 108 returns to step S1 and repeats the same processing as the abovementioned processing. On the other hand, in the case of receiving a second anomaly detection result (YES at step S7), the determination unit 108 creates a third anomaly detection result including the second anomaly detection result, transmits the third anomaly detection result to the output unit 110, and requests for output of the third anomaly detection result (step S8). Next, the determination unit 108 checks whether or not a sensor ID pair with the detection time after the time that is a given time before the collection time of anomalous log data that is the second anomaly detection result is stored in the storage unit 109 (step S9). In a case where such a sensor ID pair is stored in the storage unit (YES at step S9), the determination unit 108 associates the anomalous log data that is the second anomaly detection result with the sensor ID pair, and registers into the storage unit 109 (step S10). To be specific, the determination unit 108 records the anomalous log data into the anomalous log data field of an entry in which the sensor ID pair is to be recorded. Then, the determination unit 108 returns to step S1 and repeats the same processing as the abovementioned processing. In the case of determining that the sensor ID pair is not stored in the storage unit 109 at step S9, the determination unit 108 returns to step S1 and repeats the same processing as the abovementioned processing.

The output unit 110 is configured to, in accordance with the request from the determination unit 108, display the third anomaly detection result received from the determination unit 108 on a screen of a display device and/or transmit to an external terminal device.

Figure 13:
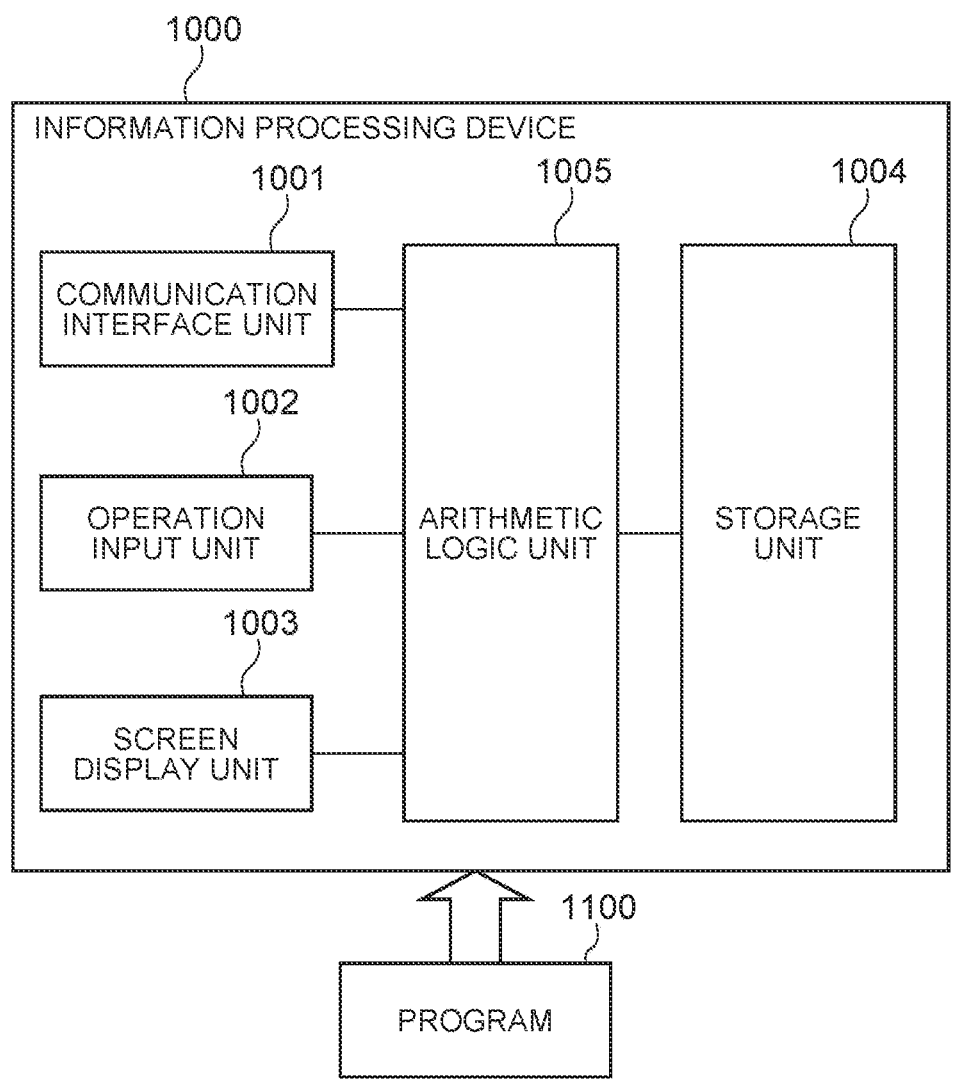
FIG. 13 is a view showing an example of a configuration of an information processing device realizing an anomaly detection device according to the present invention.

For example, as shown in FIG. 13, the anomaly detection device 100 can be realized by an information processing device 1000, such as a personal computer, and a program 1100. The information processing device 1000 includes a communication interface 1001, an operation input unit 1002 such as keyboard and a mouse, a screen display unit 1003 such as a liquid crystal display, a storage unit 1004 such as a memory and a hard disk, and an arithmetic logic unit 1005 such as one or more microprocessors. The program 1100 is loaded into the storage unit 1004 from an external computer-readable storage medium, for example, at the time of startup of the information processing device 1000, and controls the operation of the arithmetic logic unit 1005 and thereby realizes the collection unit 101, the first learning unit 102, the second learning unit 103, the first model 104, the second model 105, the first anomaly detection unit 106, the second anomaly detection unit 107, the determination unit 108, the storage unit 109 and the output unit 110 on the arithmetic logic unit 1005.

Next, an operation of the anomaly detection device 100 according to this example embodiment will be described. The operation of the anomaly detection device 100 is roughly classified into an operation in learning and an operation in anomaly detection.

<Operation in Learning>

The anomaly detection device 100 learns the first model 104 and the second model 105 during normal operation of the monitored system 200. To be specific, the anomaly detection device 100 operates in the following manner.

The collection unit 101 regularly collects the sensor data 210 from the monitored system 200 and supplies the collected sensor data 210 to the first learning unit 102. Moreover, the collection unit 101 collects the log data 211 from the monitored system 200 and supplies the collected log data 211 to the second learning unit 103.

The first learning unit 102 extracts an invariant correlation existing between time-series data of the sensor data 210 based on the sensor data 210 supplied from the collection unit 101, and registers model data including a mathematical formula representing the extracted correlation and a sensor ID pair to the first model 104. Moreover, the second learning unit 103 extracts a log pattern from the log data 211 supplied from the collection unit 101, and registers the extracted log pattern to the second model 105.

<Operation in Anomaly Detection>

The anomaly detection device 100 detects an anomaly in the monitored system 200 by using the learned first model 104 and the learned second model 105. To be specific, the anomaly detection device 100 operates in the following manner.

The collection unit 101 regularly collects the sensor data 210 from the monitored system 200 and supplies the collected sensor data 210 to the first anomaly detection unit 106. Moreover, the collection unit 101 collects the log data 211 from the monitored system 200 and supplies the collected log data 211 to the second anomaly detection unit 107.

The first anomaly detection unit 106 detects for each sensor ID pair registered in the first model 104 whether or not an invariant correlation between time-series data of the sensor data 210 supplied from the collection unit 101 is destroyed. When detecting a sensor ID pair with the correlation destroyed, the first anomaly detection unit 106 outputs a first anomaly detection result including the sensor ID pair with the correlation destroyed, the time when the destruction of the correlation is detected and time-series data of both the sensors to the determination unit 108.

Further, the second anomaly detection unit 107 extracts a log pattern from the log data 211 supplied from the collection unit 101, determines whether or not the extracted log pattern is stored in the second model 105, and thereby determines whether or not the log data 211 is anomalous log data. When detecting anomalous log data, the second anomaly detection unit 107 outputs a second anomaly detection result including the anomalous log data to the determination unit 108.

By making a comprehensive determination based on the results of detection by the first anomaly detection unit 106 and the second anomaly detection unit 107, the determination unit 108 generates a third anomaly detection result and outputs the third anomaly detection result through the output unit 110.

For example, when receiving a first anomaly detection result including a sensor ID pair with an irrelevant correlation destroyed from the first anomaly detection unit 106, if anomalous log data associated with the sensor ID pair is not stored in the storage unit 109, the determination unit 108 generates a third anomaly detection result including the sensor ID pair with the irrelevant correlation destroyed and the destruction time, outputs the third anomaly detection result through the output unit 110, and registers the sensor ID pair and the destruction time to the storage unit 109. As described above, when a sensor ID pair with an irrelevant correlation destroyed is detected by the first anomaly detection unit 106, if associated anomalous log data is not stored in the storage unit 109, it is possible, by immediately generating and outputting a third anomaly detection result without waiting for occurrence of the associated anomaly data, to detect an unknown anomaly at early stage. Moreover, by registering a sensor ID pair and the detection time into the storage unit 109 as described above in detection of an unknown anomaly, it is possible to store anomalous log data detected within a given time thereafter into the storage unit 109 in association with the unknown anomaly. That is to say, when receiving anomalous log data from the second anomaly detection unit 107, if a sensor ID pair with the detection time after the time that is a given time before the collection time of the anomalous log data is stored in the storage unit 109, the determination unit 108 registers the anomalous log data into the storage unit 109 in association with the sensor ID pair. Besides, generating and outputting an anomaly detection result including the detected anomalous log data enables the system administrator to identify the cause of an unknown anomaly detected at early stage. That is to say, an unknown anomaly can be detected at early stage and a causative log can be identified.

Further, for example, when receiving a first anomaly detection result including a sensor ID pair with an irrelevant correlation destroyed from the first anomaly detection unit 106, if anomalous log data associated with the sensor ID pair is stored in the storage unit 109, the determination unit 108 generates a third anomaly detection result including the stored anomalous log data as anomalous log data anticipated to occur in the future, and outputs through the output unit 110. Consequently, with respect to a known anomaly, it is possible to forecast anomalous log data anticipated to occur and output it to the system administrator before anomalous log data is actually detected. That is to say, it is possible to forecast the cause of the anomaly before the appearance of the anomalous log. Therefore, the system administrator can make a comprehensive determination at early stage by using the actually detected anomaly sensor data and the forecast anomalous log data in combination. This enables early recovery and avoidance of failures in the monitored system.

Second Example Embodiment

Figure 6:
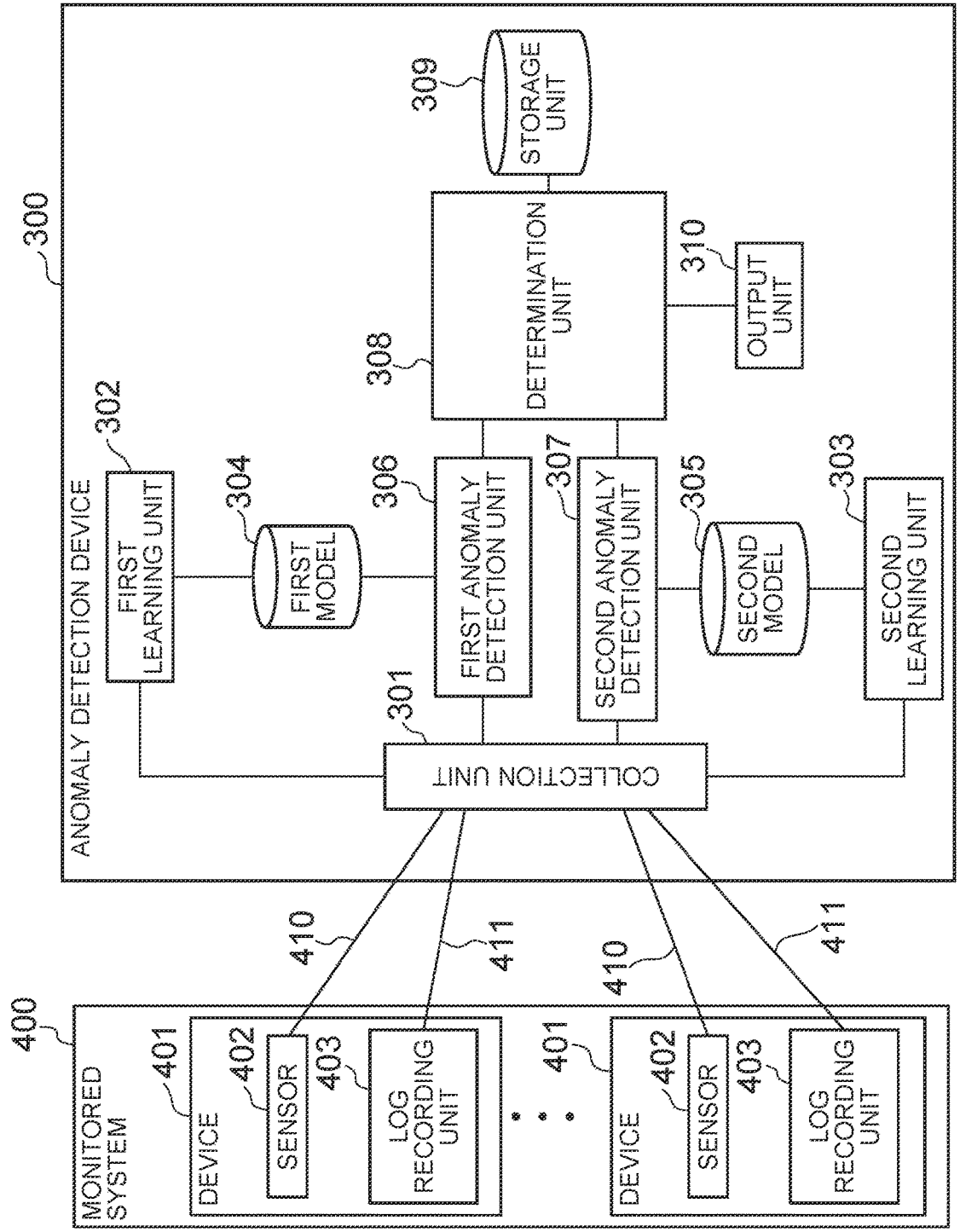
FIG. 6 is a block diagram of an anomaly detection device according to a second example embodiment of the present invention.

FIG. 6 is a block diagram of an anomaly detection device 300 according to a second example embodiment of the present invention. Referring to FIG. 6, the anomaly detection device 300 is connected to a monitored system 400 through a communication channel or a network by wired or wireless connection.

The monitored system 400 is a system that is the target of anomaly detection. In this example embodiment, the monitored system 400 is a system, such as an IT (Information Technology) system, an ITC (Information and Communication Technology) system, and an IoT (Internet of Things) system, in which when an anomaly occurs, an anomalous log is first output and thereafter an anomaly occurs in the measured value of a sensor. That is to say, the monitored system 400 is, for example, a system in which when a network error occurs, an anomalous log is output and thereafter correlation destruction occurs due to traffic increase. The monitored system 400 includes a plurality of devices 401. The devices 401 are information processing devices such as various kinds of server devices, network switches, and personal computers, for example.

The device 401 includes a sensor 402 that measures the state of each unit of the device 401. The sensor 402 is, for example, a sensor that measures a CPU usage rate, a sensor that measures memory usage, a sensor that measures the number of received packets and the number of transmitted packets, a sensor that measures a network load, a sensor that measures the number of tasks waiting to be processed, and the like. The sensor 402 outputs sensor data 410. The sensor data 410 includes, for example, a sensor ID that uniquely identifies the sensor 402, a measured value such as a CPU usage rate, and a timestamp indicating the measured time.

Further, the device 401 includes a log recording unit 403 that outputs log data 411 in text format. The log data 411 includes, for example, a text message showing the operation status and the operation history of the device 401 and a timestamp indicating the collected time.

The anomaly detection device 300 is a device that detects an anomaly in the monitored system 400. The anomaly detection device 300 is configured to detect an anomaly in the monitored system 400 based on the sensor data 410 of the sensor 402 and the log data 411 of the log recording unit 403. The anomaly detection device 300 includes a collection unit 301, a first learning unit 302, a second learning unit 303, a first model 304, a second model 305, a first anomaly detection unit 306, a second anomaly detection unit 307, a determination unit 308, a storage unit 309, and an output unit 310. Among these units, the collection unit 301, the first learning unit 302, the second learning unit 303, the first model 304, the second model 305, the first anomaly detection unit 306, the second anomaly detection unit 307, and the output unit 310 are the same as the collection unit 101, the first learning unit 102, the second learning unit 103, the first model 104, the second model 105, the first anomaly detection unit 106, the second anomaly detection unit 107 and the output unit 110 of the anomaly detection device 100 shown in FIG. 1.

The storage unit 309 is configured so that log data (anomalous log data) that the second anomaly detection unit 307 detects an anomaly and a sensor ID pair that the first anomaly detection unit 306 detects an anomaly before the lapse of a given time from the collection time of the anomalous log data (a pair of IDs of two sensors with destruction of an invariant correlation between time-series data being detected) and the detection time thereof are associated and stored. The storage unit 309 is referred to and updated by the determination unit 308. In the storage unit 309 in the initial state, significant data is not recorded.

FIG. 7 shows an example of data stored in the storage unit 309. The storage unit 309 has a plurality of entries. Each of the entries includes anomalous log data, the pattern of the anomalous log data, the collection time of the anomalous log data, a sensor ID pair, and the detection time. For example, in the entry on the first row, the pair of sensor ID=11 and sensor ID=12 and detection time $t_{21}$ are recorded in association with log data X, a pattern PX and collection time $t_{11}$. Herein, the pattern PX is the pattern of the log data X, and is the same as a pattern extracted by the second anomaly detection unit 307 from the log data X for the purpose of anomaly detection. The collection time $t_{11}$ is identical to the collection time indicated by a timestamp included in the log data X.

The determination unit 308 is configured to generate a third anomaly detection result by making a comprehensive determination based on the results of detection by the first anomaly detection unit 306 and the second anomaly detection unit 307.

Figure 8:
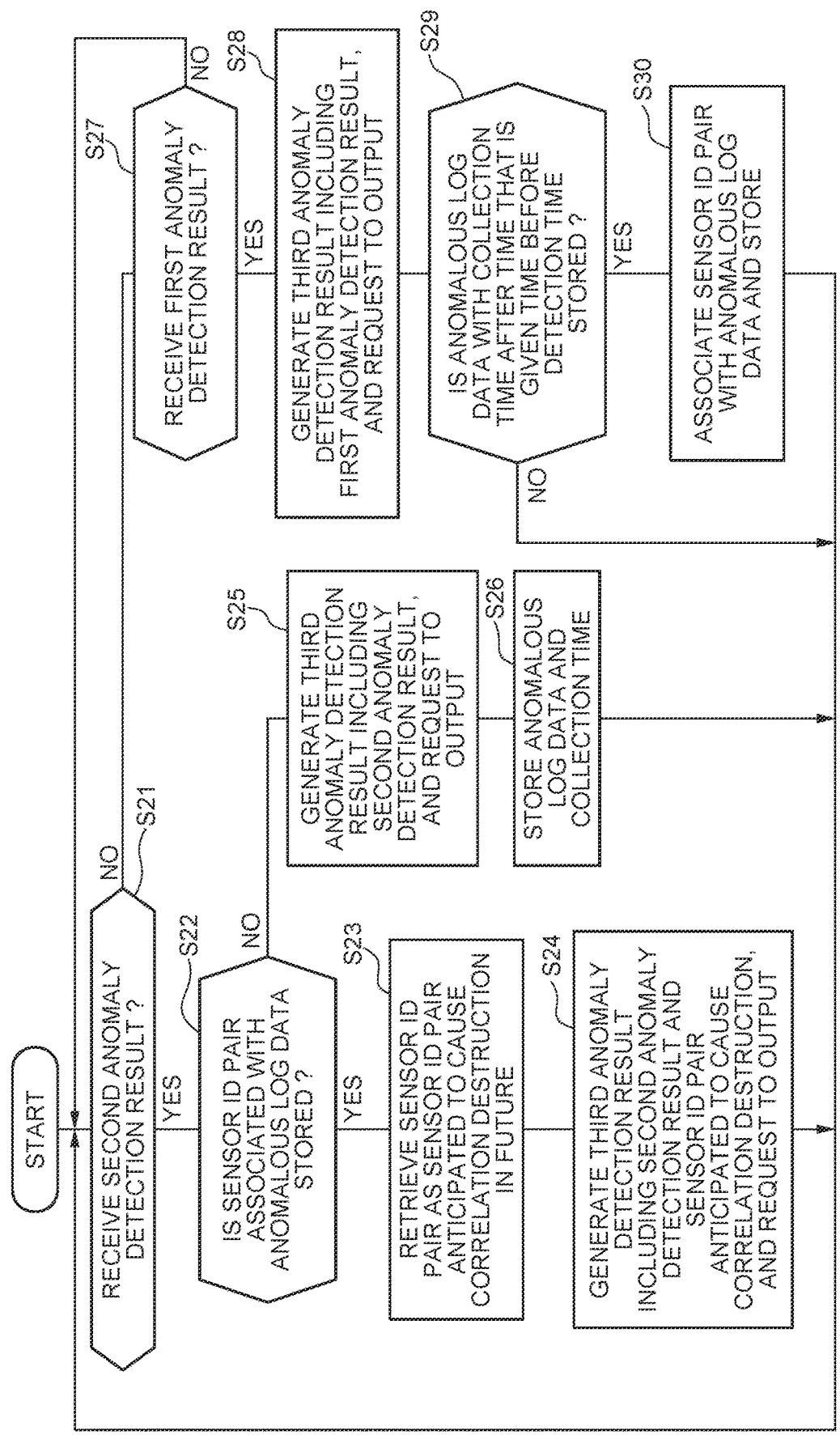
FIG. 8 is a flowchart showing an example of processing by a determination unit in the anomaly detection device according to the second example embodiment of the present invention.

FIG. 8 is a flowchart showing an example of processing by the determination unit 308. Referring to FIG. 8, the determination unit 308 first determines whether or not a second anomaly detection result is received from the second anomaly detection unit 307 (step S21). In the case of receiving a second anomaly detection result (YES at step S21), the determination unit 308 checks whether or not a sensor ID pair associated with anomalous log data that is the second anomaly detection result is stored in the storage unit 309 (step S22). In checking whether or not a sensor ID pair associated with anomalous log data is stored in the storage unit 309, the determination unit 308 checks, for example, whether or not the storage unit 309 includes an entry in which anomalous log data whose content is identical to that of the anomalous log data except the collection time is stored and a sensor ID pair is stored in the entry. Alternatively, the determination unit 308 may check whether or not the storage unit 309 includes an entry in which a pattern that is identical to a log pattern extracted from the anomalous log data is stored and a sensor ID pair is stored in the entry. If an associated sensor ID pair is stored in the storage unit 109 (YES at step S22), the determination unit 308 retrieves the associated sensor ID pair as a sensor ID pair anticipated to cause correlation destruction in the future from the storage unit 309 (step S23). Next, the determination unit 308 creates a third anomaly detection result including the anomalous log data that is the second anomaly detection result and the sensor ID pair anticipated to cause correlation destruction in the future, transmits the third anomaly detection result to the output unit 310, and requests to output the third anomaly detection result (step S24). The determination unit 308 may forecast the time when correlation destruction occurs based on the time difference between the detection time and the collection time stored in the storage unit 309 together with the sensor ID pair, and include the forecast time in the third anomaly detection result. For example, it is assumed that, in a case where the collection time of the currently detected anomalous log data is $t_{31}$ and the time difference between the detection time and the collection time stored in the storage unit 309 together with identical anomalous log data stored in the storage unit 309 is δt, time $t_{31}$+δt is the forecast time. Then, the determination unit 308 returns to step S21 and repeats the same processing as the abovementioned processing.

If an associated sensor ID pair is not stored in the storage unit 309 (NO at step S22), the determination unit 308 creates a third anomaly detection result including the second anomaly detection result, transmits the third anomaly detection result to the output unit 310, and requests to output the third anomaly detection result (step S25). Next, the determination unit 308 registers anomalous log data, the pattern thereof and the collection time thereof included by the second anomaly detection result into the storage unit 309 (step S26). To be specific, at step S26, the determination unit 308 registers the anomalous log data, the pattern thereof and the collection time thereof included in the second anomaly detection result into the anomalous log data field, the pattern field and the collection time field of one vacant entry in the storage unit 309, and leaves the sensor ID pair field and the detection time field NULL. Then, the determination unit 308 returns to step S21 and repeats the same processing as the abovementioned processing.

Further, the determination unit 308 determines whether or not a first anomaly detection result is received from the first anomaly detection unit 306 (step S27). In the case of not receiving a first anomaly detection result (NO at step S27), the determination unit 308 returns to step S21 and repeats the same processing as the abovementioned processing. On the other hand, in the case of receiving a first anomaly detection result (YES at step S27), the determination unit 308 creates a third anomaly detection result including the first anomaly detection result, transmits the third anomaly detection result to the output unit 310, and requests to output the third anomaly detection result (step S28). Next, the determination unit 308 checks whether or not anomalous log data with the collection time after the time that is a given time before the detection time of the first anomaly detection result is stored in the storage unit 309 (step S29). If such anomalous log data is stored in the storage unit 309 (YES at step S29), the determination unit 308 registers the sensor ID pair with the correlation being destroyed and the detection time thereof that are included in the first anomaly detection result into the storage unit 309 in association with the anomalous log data (step S30). To be specific, the determination unit 308 registers the sensor ID pair with the correlation being destroyed and the detection time thereof into the sensor ID pair field and the detection time field of an entry in which the anomalous log data is to be recorded. Then, the determination unit 308 returns to step S21 and repeats the same processing as the abovementioned processing. In the case of determining that the anomalous log data is not stored in the storage unit 309 at step S29, the determination unit 308 skips step S30, returns to step S21, and repeats the same processing as the abovementioned processing.

As with the anomaly detection device 100, the anomaly detection device 300 can be realized by the information processing device 1000 and the program 1100 as shown in FIG. 13. The program 1100 is loaded into the storage unit 1004 from an external computer-readable storage medium, for example, at the time of startup of the information processing device 1000, and controls the operation of the arithmetic logic unit 1005 and thereby realizes the collection unit 301, the first learning unit 302, the second learning unit 303, the first model 304, the second model 305, the first anomaly detection unit 306, the second anomaly detection unit 307, the determination unit 308, the storage unit 309 and the output unit 310 on the arithmetic logic unit 1005.

Next, an operation of the anomaly detection device 300 according to this example embodiment will be described. The operation of the anomaly detection device 300 is roughly classified into an operation in learning and an operation in anomaly detection. The operation in learning is the same as the operation in learning of the anomaly detection device 100 according to the first example embodiment shown in FIG. 1. The operation in anomaly detection is the same as the operation in anomaly detection of the anomaly detection device 100 according to the first example embodiment shown in FIG. 1, except the operation of the determination unit 308. The operation of the determination unit 308 in anomaly detection will be described below.
<Operation of Determination Unit 308 in Anomaly Detection>

The determination unit 308 makes a comprehensive determination based on the results of detection by the first anomaly detection unit 306 and the second anomaly detection unit 307, and thereby generates a third anomaly detection result and outputs the third anomaly detection result through the output unit 310.

For example, when receiving a second anomaly detection result including anomalous log data from the second anomaly detection unit 307, if a sensor ID pair associated with the anomalous log data is not stored in the storage unit 309, the determination unit 308 generates a third anomaly detection result including the anomalous log data, outputs the third anomaly detection result through the output unit 310, and registers the anomalous log data, the pattern thereof and the collection time thereof into the storage unit 309. Thus, when the second anomaly detection unit 307 detects anomalous log data, if an associated sensor ID pair is not stored in the storage unit 309, it is possible, by immediately generating and outputting a third anomaly detection result without waiting for occurrence of correlation destruction between the associated sensor ID pair, to detect an unknown anomaly at early stage and output. Moreover, by registering anomalous log data, the pattern thereof and the collection time thereof into the storage unit 309 as described above in detection of an unknown anomaly, it is possible to store a sensor ID pair with correlation destruction occurring detected within a given time thereafter into the storage unit 309 in association with the unknown anomaly. That is to say, when receiving a sensor ID pair with correlation being destroyed and the detection time from the first anomaly detection unit 306, if anomalous log data with the collection time after the time that is a given time before the detection time, the determination unit 308 registers the sensor ID pair and the detection time into the storage unit 309 in association with the anomalous log data.

Further, for example, when receiving a second anomaly detection result including anomalous log data from the second anomaly detection unit 307, if a sensor ID pair associated with the anomalous log data is stored in the storage unit 309, the determination unit 308 generates a third anomaly detection result including the stored sensor ID pair as a sensor ID pair that correlation destruction may occur in the future, and outputs the third anomaly detection result through the output unit 310. Consequently, with respect to a known anomaly, it is possible to output a sensor ID pair that correlation destruction occurs before correlation destruction is actually detected. Thus, with respect to a known anomaly, the system administrator can make a comprehensive determination at early stage by using anomalies of a plurality of monitored data including the sensor data 410 and the log data 411 in combination.

Third Example Embodiment

Figure 9:
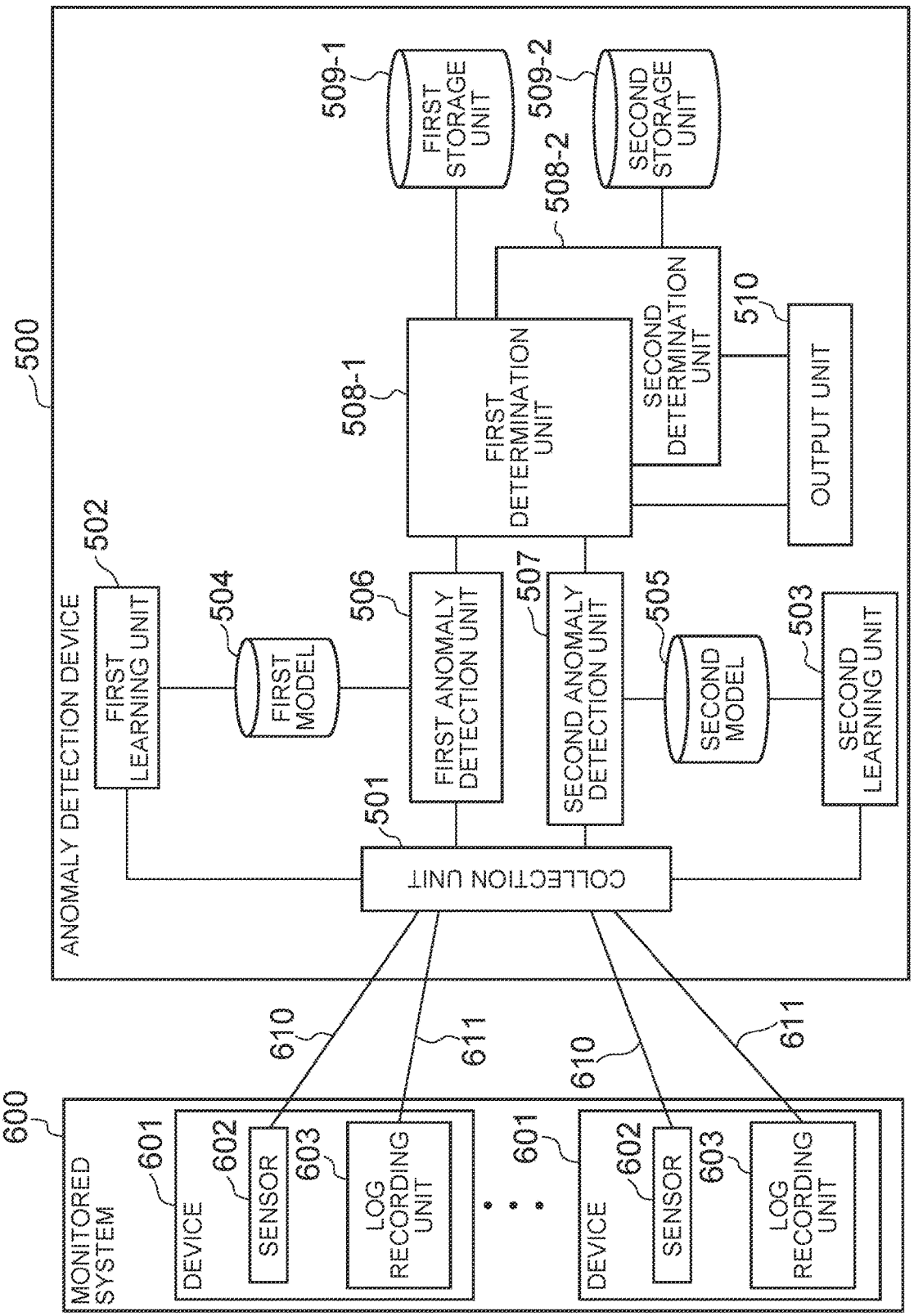
FIG. 9 is a block diagram of an anomaly detection device according to a third example embodiment of the present invention.

FIG. 9 is a block diagram of an anomaly detection device 500 according to a third example embodiment of the present invention. Referring to FIG. 9, the anomaly detection device 500 is connected to a monitored system 600 through a communication channel or a network by wired or wireless connection.

The monitored system 600 is a system that is the target of anomaly detection. In this example embodiment, the monitored system 600 is a system including both a system such as a plant system in which when an anomaly occurs, an anomaly occurs first in the measured value of a sensor and thereafter an anomalous log is output and a system such as an IT system, an ITC system and an IoT system in which when an anomaly occurs, an anomalous log is output first and thereafter an anomaly occurs in the measured value of a sensor. The monitored system 600 includes a plurality of devices 601. The devices 601 are, for example, plant facilities such as a boiler, a turbine, a power generation device and a control computer, and information processing devices such as various kinds of server devices, network switches and personal computers.

The device 601 includes a sensor 602 that measures the state of each unit of the device 601. The sensor 602 is, for example, a temperature sensor, a pressure sensor, a flow rate sensor, a sensor that measures a CPU usage rate, a sensor that measures memory usage, a sensor that measures the number of received packets and the number of transmitted packets, a sensor that measures a network load, a sensor that measures the number of tasks waiting to be processed, and the like. The sensor 602 outputs sensor data 610. The sensor data 610 includes, for example, a sensor ID that uniquely identifies the sensor 602, a measured value such as a temperature and a CPU usage rate, and a timestamp indicating the measurement time.

Further, the device 601 includes a log recording unit 603 that outputs log data 611 in text format. The log data 611 includes, for example, a text message indicating the operation status and the operation history of the device 601, and a timestamp indicating the collection time.

The anomaly detection device 500 is a device that detects an anomaly in the monitored system 600. The anomaly detection device 500 is configured to detect an anomaly in the monitored system 600 based on the sensor data 610 of the sensor 602 and the log data 611 of the log recording unit 603. The anomaly detection device 500 includes a collection unit 501, a first learning unit 502, a second learning unit 503, a first model 504, a second model 505, a first anomaly detection unit 506, a second anomaly detection unit 507, a first determination unit 508-1, a second determination unit 508-2, a first storage unit 509-1, a second storage unit 509-2, and an output unit 510. Among these units, the collection unit 501, the first learning unit 502, the second learning unit 503, the first model 504, the second model 505, the first anomaly detection unit 506, the second anomaly detection unit 507, the first storage unit 509-1, and the output unit 510 are the same as the collection unit 101, the first learning unit 102, the second learning unit 103, the first model 104, the second model 105, the first anomaly detection unit 106, the second anomaly detection unit 107, the storage unit 109 and the output unit 110 of the anomaly detection device 100 shown in FIG. 1. The second storage unit 509-2 is the same as the storage unit 309 of the anomaly detection device 300 shown in FIG. 6.

The first determination unit 508-1 and the second determination unit 508-2 are configured to generate a third anomaly detection result by making a comprehensive determination based on the results of detection by the first anomaly detection unit 506 and the second anomaly detection unit 507.

Figure 10:
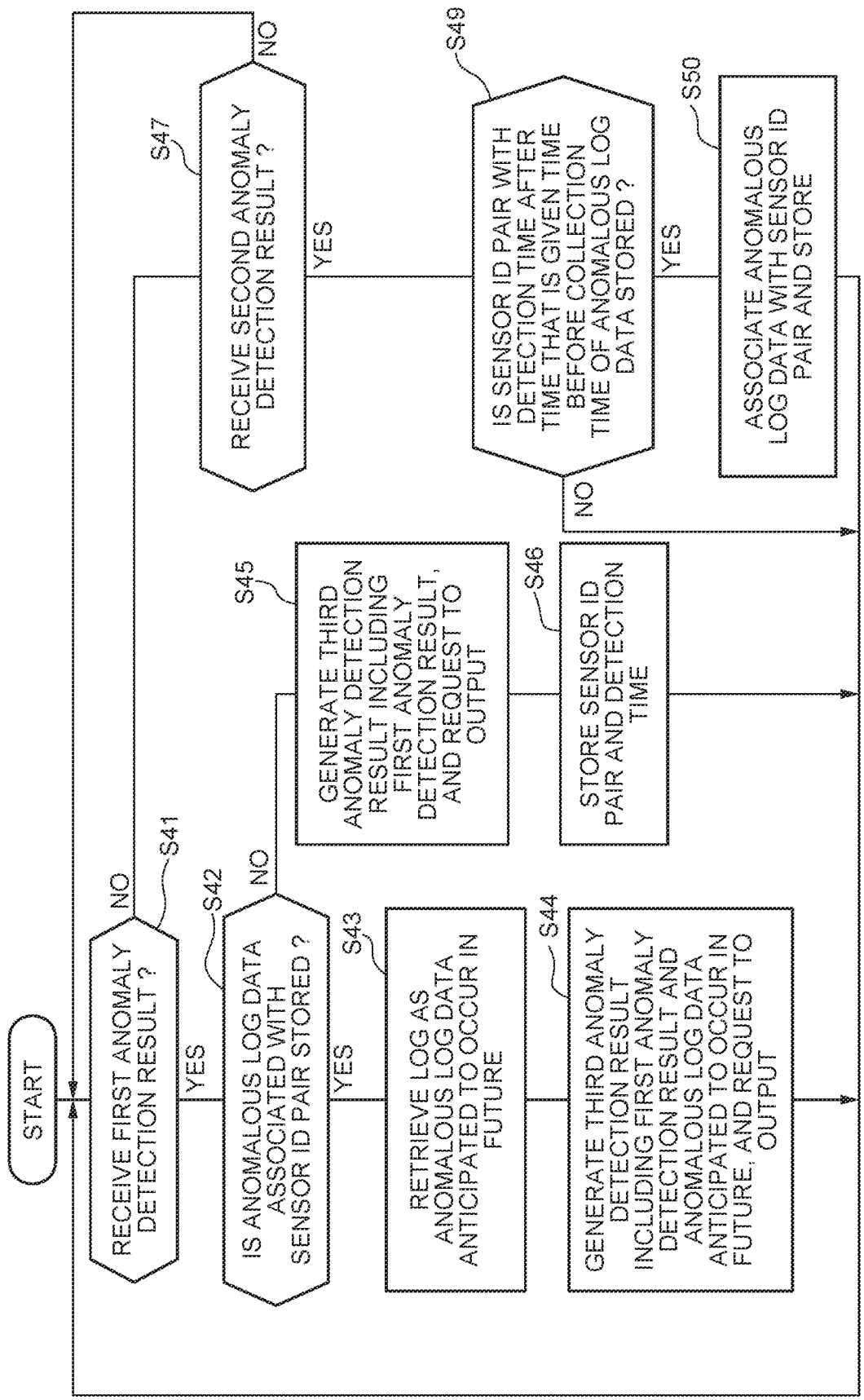
FIG. 10 is a flowchart showing an example of processing by a first determination unit in the anomaly detection device according to the third example embodiment of the present invention.

FIG. 10 is a flowchart showing an example of processing by the first determination unit 508-1. The processing shown in FIG. 10 differs from the processing by the determination unit 108 shown in FIG. 5 in that a step corresponding to step S8 is omitted, and is otherwise identical to the processing by the determination unit 108. That is to say, steps S41 to S47 and S49 to S50 are the same as steps S1 to S7 and S9 to S10 of FIG. 5.

Figure 11:
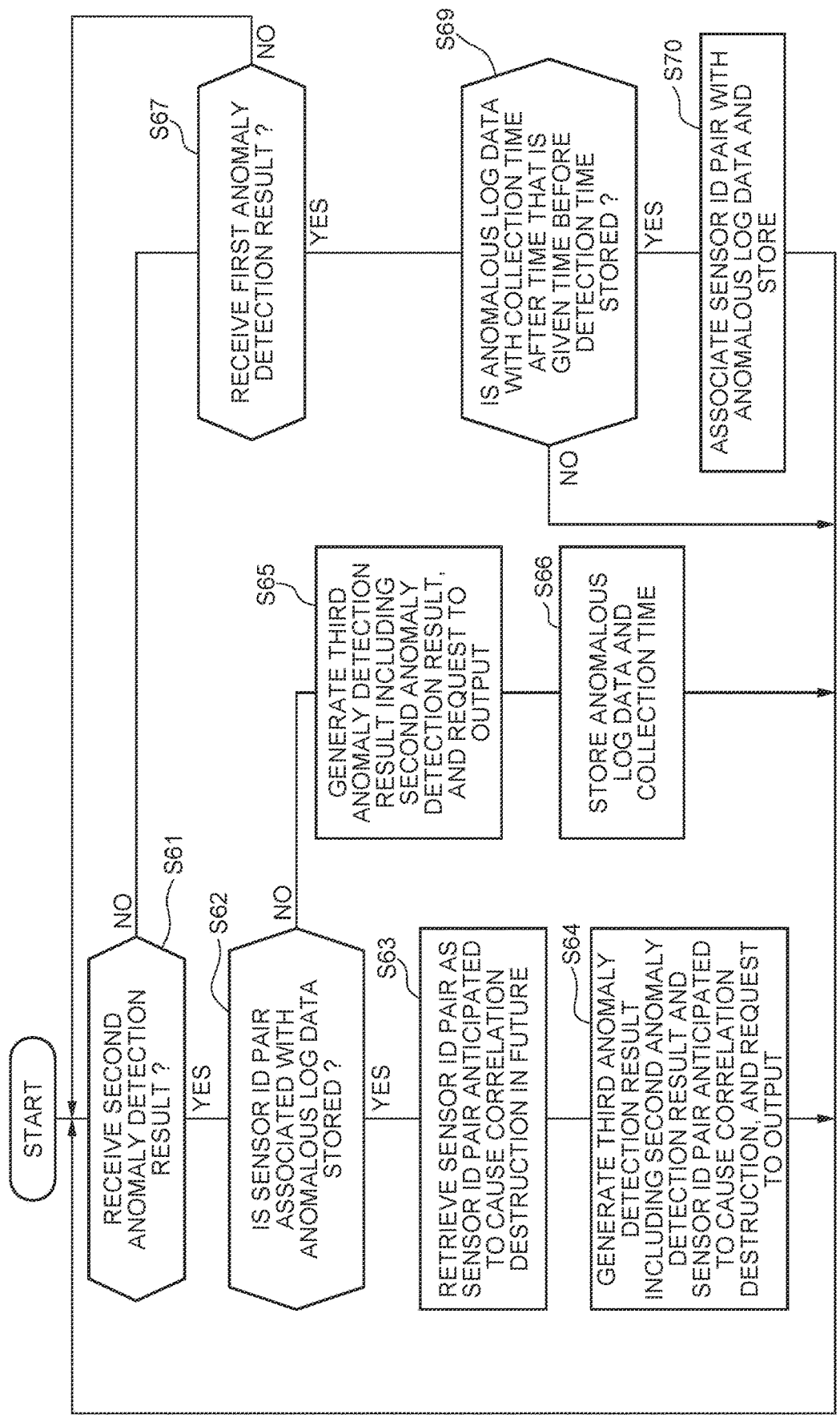
FIG. 11 is a flowchart showing an example of processing by a second determination unit in the anomaly detection device according to the third example embodiment of the present invention.

FIG. 11 is a flowchart showing an example of processing by the second determination unit 508-2. The processing shown in FIG. 11 differs from the processing by the determination unit 308 shown in FIG. 8 in that a step corresponding to step S28 is omitted, and is otherwise identical to the processing by the determination unit 308. That is to say, steps S61 to S67 and S69 to S70 are the same as steps S21 to S27 and S29 to S30 of FIG. 8.

As with the anomaly detection device 100, the anomaly detection device 500 can be realized by the information processing device 1000 and the program 1100 as shown in FIG. 13. The program 1100 is loaded into the storage unit 1004 from an external computer-readable storage medium, for example, at the time of startup of the information processing device 1000, and controls the operation of the arithmetic logic unit 1005 and thereby realizes the collection unit 501, the first learning unit 502, the second learning unit 503, the first model 504, the second model 505, the first anomaly detection unit 506, the second anomaly detection unit 507, the first determination unit 508-1, the second determination unit 508-2, the first storage unit 509-1, the second storage unit 509-2 and the output unit 510 on the arithmetic logic unit 1005.

Next, an operation of the anomaly detection device 500 according to this example embodiment will be described. The operation of the anomaly detection device 500 is roughly classified into an operation in learning and an operation in anomaly detection. The operation in learning is the same as the operation in learning of the anomaly detection device 100 according to the first example embodiment shown in FIG. 1. The operation in anomaly detection is the same as the operation in anomaly detection of the anomaly detection device 100 according to the first example embodiment shown in FIG. 1, except the operation of the first determination unit 508-1 and the second determination unit 508-2. The operation of the first determination unit 508-1 and the second determination unit 508-2 in anomaly detection will be described below.

<Operation of First Determination Unit 508-1 in Anomaly Detection>

The operation of the first determination unit 508-1 in anomaly detection differs from the operation of the determination unit 108 in anomaly detection in that an operation corresponding to step S8 is omitted, and is otherwise the same as the operation of the determination unit 108 in anomaly detection. Therefore, the first determination unit 508-1 operates in the following manner, for example.

For example, when receiving a first anomaly detection result including a sensor ID pair with an irrelevant correlation destroyed from the first anomaly detection unit 506 (YES at step S41), if anomalous log data associated with the sensor ID pair is not stored in the first storage unit 509-1 (NO at step S42), the first determination unit 508-1 generates a third anomaly detection result including the sensor ID pair with the irrelevant correlation destroyed and the detection time thereof, outputs the third anomaly detection result through the output unit 510 (step S45), and also registers the sensor ID pair and the detection time to the first storage unit 509-1 (step S46). Thus, when a sensor ID pair with an irrelevant correlation destroyed is detected by the first anomaly detection unit 506, if associated anomalous log data is not stored in the first storage unit 509-1, it is possible, by immediately generating and outputting a third anomaly detection result without waiting for occurrence of the associated anomaly data, to detect an unknown anomaly at early stage and output. Moreover, by registering a sensor ID pair and the detection time into the first storage unit 509-1 as described above when detecting an unknown anomaly, it is possible to associate anomalous log data detected within a given time thereafter with the unknown anomaly and store in the first storage unit 509-1. That is to say, when receiving anomalous log data from the second anomaly detection unit 507 (YES at step S47), if a sensor ID pair with the destruction time after the time that is a given time before the collection time of the anomalous log data is stored in the first storage unit 509-1 (YES at step S49), the first determination unit 508-1 associates the anomalous log data with the sensor ID pair and register into the first storage unit 509-1 (step S50).

Further, for example, when receiving a first anomaly detection result including a sensor ID pair with an irrelevant correlation destroyed from the first anomaly detection unit 506 (YES at step S41), if anomalous log data associated with the sensor ID pair is stored in the first storage unit 509-1 (YES at step S42), the first determination unit 508-1 generates a third anomaly detection result including the stored anomalous log data as anomalous log data anticipated to occur in the future, and outputs the third anomaly detection result through the output unit 510 (steps S43 to S44). Consequently, with respect to a known anomaly, it is possible to output anomalous log data anticipated to occur before anomalous log data is actually detected. Therefore, the system administrator can make a comprehensive determination at early stage by using anomalies of a plurality of monitored data including the sensor data 610 and the log data 611 in combination.

<Operation of Second Determination Unit 508-2 in Anomaly Detection>

The operation of the second determination unit 508-2 in anomaly detection differs from the operation of the determination unit 308 in anomaly detection in that an operation corresponding to step S28 is omitted, and is otherwise the same as the operation of the determination unit 308 in anomaly detection. Therefore, the second determination unit 508-2 operates in the following manner, for example.

For example, when receiving a second anomaly detection result including anomalous log data from the second anomaly detection unit 507 (YES at step S61), if a sensor ID pair associated with the anomalous log data is not stored in the second storage unit 509-2 (NO at step S62), the second determination unit 508-2 generates a third anomaly detection result including the anomalous log data, outputs the third anomaly detection result through the output unit 510 (step S65), and registers the anomalous log data, the pattern thereof and the collection time thereof into the second storage unit 509-2 (step S66). Thus, when the second anomaly detection unit 507 detects anomalous log data, if an associated sensor ID par is not stored in the second storage unit 509-2, it is possible, by immediately generating and outputting a third anomaly detection result without waiting for occurrence of correlation destruction between the associated sensor ID pair, to detect an unknown anomaly at early stage and output. Moreover, by registering anomalous log data, the pattern thereof and the collection time thereof into the second storage unit 509-2 as described above when detecting an unknown anomaly, it is possible to store a sensor ID pair having caused correlation destruction detected within a given time thereafter into the second storage unit 509-2 in association with the unknown anomaly. That is to say, when receiving a sensor ID pair with correlation destroyed and the detection time from the first anomaly detection unit 506 (YES at step S67), if anomalous log data with the collection time after the time that is a given time before the detection time is stored in the second storage unit 509-2 (YES at step S69), the second determination unit 508-2 registers the sensor ID pair and the detection time into the second storage unit 509-2 in association with the anomalous log data (step S70).

Further, for example, when receiving a second anomaly detection result including anomalous log data from the second anomaly detection unit 507 (YES at step S61), if a sensor ID pair associated with the anomalous log data is stored in the storage unit 509 (step S62), the second determination unit 508-2 generates a third anomaly detection result including the stored sensor ID pair as a sensor ID pair that correlation destruction may occur in the future, and outputs the third anomaly detection result through the output unit 510 (steps S63 to S64). Consequently, with respect to a known anomaly, it is possible to output a sensor ID pair that correlation destruction occurs before correlation destruction is actually detected. Thus, with respect to a known anomaly, the system administrator can make a comprehensive determination at early stage by using anomalies of a plurality of monitored data including the sensor data 610 and the log data 611 in combination.

Fourth Example Embodiment

Figure 12:
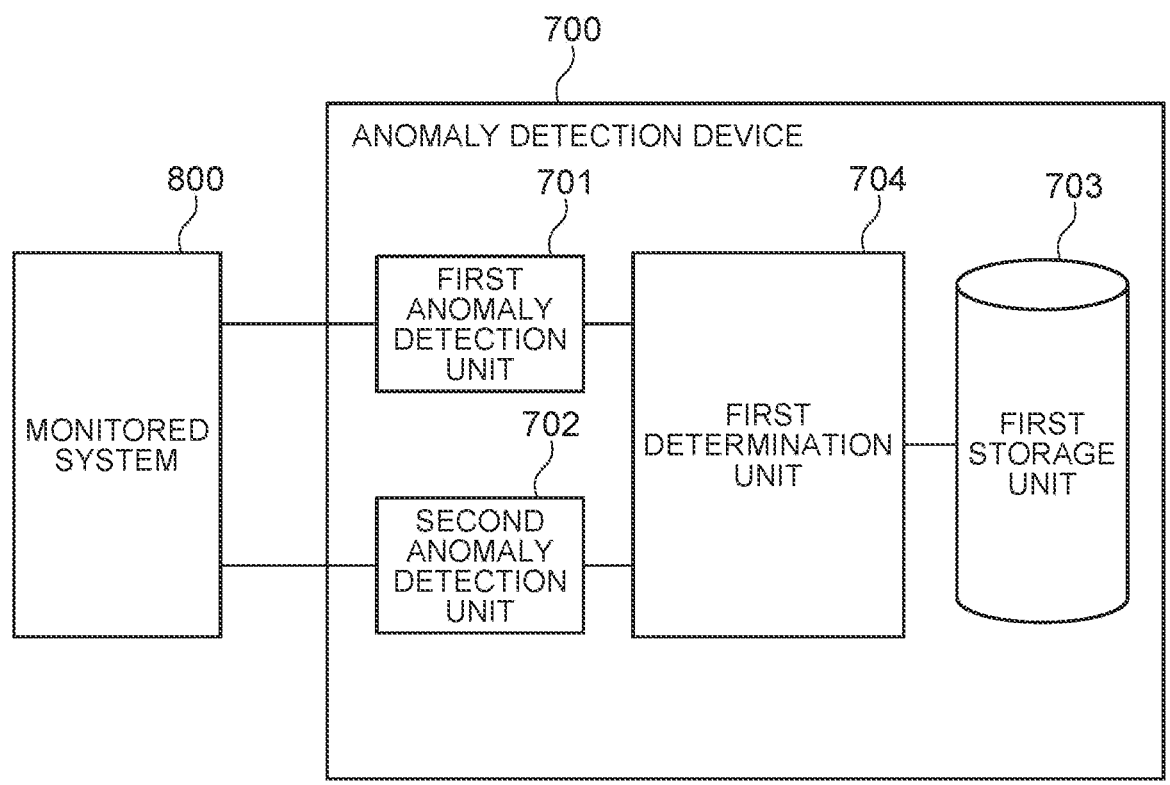
FIG. 12 is a block diagram of the anomaly detection device according to the third example embodiment of the present invention.

FIG. 12 is a block diagram of an anomaly detection device 700 according to a fourth example embodiment of the present invention. Referring to FIG. 12, the anomaly detection device 700 is connected to a monitored system 800 through a communication channel or a network by wired or wireless connection.

The monitored system 800 is a system that is the target of anomaly detection. From the monitored system 800, a plurality of first monitored data and a plurality of second monitored data can be taken outside. One of the first monitored data and the second monitored data includes, for example, a measured value on a performance index, and the other includes, for example, a text log. The monitored system 800 is a system in which when an anomaly occurs in the system, an anomaly first occurs in any of the plurality of first monitored data and then an anomaly occurs in any of the plurality of second monitored data.

The anomaly detection device 700 is configured to acquire a plurality of first monitored data and a plurality of second monitored data from the monitored system 800 and detect an anomaly in the monitored system 800 based on the acquired data. The anomaly detection device 700 includes a first anomaly detection 701, a second anomaly detection unit 702, a first storage unit 703, and a first determination unit 704.

The first anomaly detection unit 701 is configured to detect anomalous first monitored data from among a plurality of first monitored data obtained from the monitored system 800. The first anomaly detection unit 701 can be configured, for example, in the same manner as the first anomaly detection unit 106 of FIG. 1, but is not limited thereto.

The second anomaly detection unit 702 is configured to operate in parallel to the first anomaly detection unit 701. Moreover, the second anomaly detection unit 702 is configured to detect anomalous second monitored data from among a plurality of second monitored data obtained from the monitored system 800. The second anomaly detection unit 702 can be configured, for example, in the same manner as the second anomaly detection unit 107 of FIG. 1, but is not limited thereto.

The first storage unit 703 is configured to associate and store anomalous first monitored data and anomalous second monitored data detected before the lapse of a given time from the detection time of the anomalous first monitored data.

The first determination unit 704 is configured to, when anomalous first monitored data is detected, retrieve anomalous second monitored data associated with the detected anomalous first monitored data from the first storage unit 703. Moreover, the first determination unit 704 is configured to output a first anomaly detection result including the retrieved anomalous second monitored data and the detected anomalous first monitored data.

The anomaly detection device 700 thus configured functions in the following manner. That is to say, the first anomaly detection unit 701 detects anomalous first monitored data from among a plurality of first monitored data obtained from the monitored system 800. Moreover, the second anomaly detection unit 702 detects anomalous second monitored data from among a plurality of second monitored data obtained from the monitored system 800, in parallel with detection of anomalous first monitored data by the first anomaly detection unit 701. When anomalous first monitored data is detected, the first determination unit 704 retrieves anomalous second monitored data associated with the detected anomalous first monitored data from the first storage unit 703, and outputs a first anomaly detection result including the retrieved anomalous second monitored data and the detected anomalous first monitored data.

Thus, when anomalous first monitored data is detected, the first determination unit 704 of the anomaly detection device 700 according to this example embodiment retrieves anomalous second monitored data associated with the detected anomalous first monitored data as anomalous second monitored data anticipated to occur in the future from the first storage unit 703, and outputs a first anomaly detection result including the retrieved anomalous second monitored data and the detected anomalous first monitored data. Consequently, the system operator and so on can make a comprehensive determination at early stage by using anomalous first monitored data and second monitored data anticipated to occur in the future in combination, before anomalous second monitored data is actually detected, based on the first anomaly detection result.

Other Example Embodiment

In the above example embodiments, for example, a measured value on a performance index measured by a sensor and a text log recorded in a log recording unit are used as the first monitored data and the second monitored data, but monitored data used in the present invention is not limited to the above. For example, SNS information may be used as monitored data.

Further, each entry of the storage unit 109 shown in FIG. 4 may have a field in which an action to be performed by the system administrator is described. In that case, when the determination unit 108 retrieves anomalous log data from an entry of the storage unit 109 at step S3 of FIG. 5, the determination unit 108 may simultaneously retrieve the abovementioned action from the entry, generates a third anomaly detection result including a first anomaly detection result, anomalous log data anticipated to occur in the future, and the abovementioned action at step S4, and request to output. Moreover, each entry of the storage unit 309 shown in FIG. 7 may have a field in which an action to be performed by the system administrator is described. In that case, when the determination unit 308 retrieves a sensor ID pair anticipated to cause correlation destruction from an entry of the storage unit 309 in step S23 of FIG. 8, the determination unit 308 may simultaneously retrieves the action from the entry, generate a third anomaly detection result including a second anomaly detection result, the sensor ID pair anticipated to cause correlation destruction and the abovementioned action, and request to output.

Further, detection of an anomaly of the measured value of a performance index may be performed by a method other than a method of detecting destruction of an invariant correlation existing between time-series data of the measured value. For example, for each performance index, the range of values that can be taken by the measured value in normal time may be learned, and the presence/absence of an anomaly of the measured value of each performance index may be detected based on whether or not the measured value exceeds the learned value range.

Further, detection of an anomalous log may be performed by a method other than the method using a log pattern. For example, the method may be a method of checking whether or not a predetermined strings and symbol strings are included in a log and if included, detecting the log as an anomalous log.

Although the present invention has been described above with reference to the example embodiments, the present invention is not limited to the abovementioned example embodiment. The configurations and details of the present invention can be changed in various manners that can be understood by one skilled in the art within the scope of the present invention.

The present invention can be utilized for monitoring and failure analysis of a monitored system such as a plant system and an ICT system.

The whole or part of the exemplary embodiments disclosed above can be described as, but not limited to, the following supplementary notes.

(Supplementary Note 1)
An anomaly detection device comprising:
a first anomaly detection unit configured to detect anomalous first monitored data from among a plurality of first monitored data obtained from a monitored system;
a second anomaly detection unit configured to operate in parallel with the first anomaly detection unit and detect anomalous second monitored data from among a plurality of second monitored data obtained from the monitored system;
a first storage unit configured to have the anomalous first monitored data and the anomalous second monitored data stored therein in association with each other, the anomalous second monitored data having been detected before lapse of a given time from detection time of the anomalous first monitored data; and
a first determination unit configured to, when the anomalous first monitored data is detected, retrieve the anomalous second monitored data associated with the detected anomalous first monitored data from the first storage unit and output a first anomaly detection result including the retrieved anomalous second monitored data and the detected anomalous first monitored data.

(Supplementary Note 2)
The anomaly detection device according to Supplementary Note 1, wherein the first determination unit is configured to, when the anomalous first monitored data is detected, in a case where the anomalous second monitored data associated with the detected anomalous first monitored data is not stored in the first storage unit, store the detected anomalous first monitored data into the first storage unit and, when the anomalous second monitored data is detected before lapse of a given time from detection time of the anomalous first monitored data, store the detected anomalous second monitored data into the first storage unit in associated with the stored anomalous first monitored data.

(Supplementary Note 3)
The anomaly detection device according to Supplementary Note 1 or 2, wherein the first determination unit is configured to, when the anomalous first monitored data is detected, in a case where the anomalous second monitored data associated with the detected anomalous first monitored data is not stored in the first storage unit, output a second anomaly detection result including the detected anomalous first monitored data.

(Supplementary Note 4)
The anomaly detection device according to any of Supplementary Notes 1 to 3, further comprising:
a second storage unit configured to have the anomalous second monitored data and the anomalous first monitored data stored therein in association with each other, the anomalous first monitored data having been detected before lapse of a given time from detection time of the anomalous second monitored data; and
a second determination unit configured to, when the anomalous second monitored data is detected, retrieve the anomalous first monitored data associated with the detected anomalous second monitored data from the second storage unit and output a third anomaly detection result including the retrieved anomalous first monitored data and the detected anomalous second monitored data.

(Supplementary Note 5)
The anomaly detection device according to Supplementary Note 4, wherein the second determination unit is configured to, when the anomalous second monitored data is detected, in a case where the anomalous first monitored data associated with the detected anomalous second monitored data is not stored in the second storage unit, store the detected anomalous second monitored data into the second storage unit and, when the anomalous first monitored data is detected before lapse of a given time from detection time of the anomalous second monitored data, store the detected anomalous first monitored data into the second storage unit in associated with the stored anomalous second monitored data.

(Supplementary Note 6)

The anomaly detection device according to Supplementary Note 4 or 5, wherein the second determination unit is configured to, when the anomalous second monitored data is detected, in a case where the anomalous first monitored data associated with the detected anomalous second monitored data is not stored in the second storage unit, output a fourth anomaly detection result including the detected anomalous second monitored data.

(Supplementary Note 7)

The anomaly detection device according to any of Supplementary Notes 1 to 6, wherein the plurality of first monitored data include measured values on a plurality of performance indexes acquired from a plurality of devices configuring the monitored system, and the plurality of second monitored data include a plurality of text logs acquired from the plurality of devices configuring the monitored system.

(Supplementary Note 8)

The anomaly detection device according to any of Supplementary Notes 1 to 6, wherein the plurality of first monitored data include a plurality of text logs acquired from a plurality of devices configuring the monitored system, and the plurality of second monitored data include measured values on a plurality of performance indexes acquired from the plurality of devices configuring the monitored system.

(Supplementary Note 9)

An anomaly detection method comprising:

detecting anomalous first monitored data from among a plurality of first monitored data obtained from a monitored system;

in parallel with detecting the anomalous first monitored data, detecting anomalous second monitored data from among a plurality of second monitored data obtained from the monitored system; and when the anomalous first monitored data is detected, retrieving the anomalous second monitored data associated with the detected anomalous first monitored data from a first storage unit in which the anomalous first monitored data and the anomalous second monitored data having been detected before lapse of a given time from detection time of the anomalous first monitored data are stored in association with each other, and outputting a first anomaly detection result including the retrieved anomalous second monitored data and the detected anomalous first monitored data.

(Supplementary Note 10)

The anomaly detection method according to Supplementary Note 9, comprising, when the anomalous first monitored data is detected, in a case where the anomalous second monitored data associated with the detected anomalous first monitored data is not stored in the first storage unit, storing the detected anomalous first monitored data into the first storage unit and, when the anomalous second monitored data is detected before lapse of a given time from detection time of the anomalous first monitored data, storing the detected anomalous second monitored data into the first storage unit in associated with the stored anomalous first monitored data.

(Supplementary Note 11)

The anomaly detection method according to Supplementary Note 9 or 10, comprising, when the anomalous first monitored data is detected, in a case where the anomalous second monitored data associated with the detected anomalous first monitored data is not stored in the first storage unit, outputting a second anomaly detection result including the detected anomalous first monitored data.

(Supplementary Note 12)

The anomaly detection method according to any of Supplementary Notes 9 to 11, comprising, when the anomalous second monitored data is detected, retrieving the anomalous first monitored data associated with the detected anomalous second monitored data from a second storage unit in which the anomalous second monitored data and the anomalous first monitored data having been detected before lapse of a given time from detection time of the anomalous second monitored data are stored in association with each other, and outputting a third anomaly detection result including the retrieved anomalous first monitored data and the detected anomalous second monitored data.

(Supplementary Note 13)

The anomaly detection method according to Supplementary Note 12, comprising, when the anomalous second monitored data is detected, in a case where the anomalous first monitored data associated with the detected anomalous second monitored data is not stored in the second storage unit, storing the detected anomalous second monitored data into the second storage unit and, when the anomalous first monitored data is detected before lapse of a given time from detection time of the anomalous second monitored data, storing the detected anomalous first monitored data into the second storage unit in associated with the stored anomalous second monitored data.

(Supplementary Note 14)

The anomaly detection method according to Supplementary Note 12 or 13, comprising, when the anomalous second monitored data is detected, in a case where the anomalous first monitored data associated with the detected anomalous second monitored data is not stored in the second storage unit, outputting a fourth anomaly detection result including the detected anomalous second monitored data.

(Supplementary Note 15)

The anomaly detection method according to any of Supplementary Notes 9 to 14, wherein the plurality of first monitored data include measured values on a plurality of performance indexes acquired from a plurality of devices configuring the monitored system, and the plurality of second monitored data include a plurality of text logs acquired from the plurality of devices configuring the monitored system.

(Supplementary Note 16)

The anomaly detection method according to any of Supplementary Notes 9 to 14, wherein the plurality of first monitored data include a plurality of text logs acquired from a plurality of devices configuring the monitored system, and the plurality of second monitored data include measured values on a plurality of performance indexes acquired from the plurality of devices configuring the monitored system.

(Supplementary Note 17)

A non-transitory computer-readable recording medium having a program stored thereon, the program comprising instructions for causing a computer to function as:

a first anomaly detection unit configured to detect anomalous first monitored data from among a plurality of first monitored data obtained from a monitored system;

a second anomaly detection unit configured to operate in parallel with the first anomaly detection unit and detect anomalous second monitored data from among a plurality of second monitored data obtained from the monitored system;

a first storage unit configured to have the anomalous first monitored data and the anomalous second monitored data stored therein in association with each other, the anomalous second monitored data having been detected before lapse of a given time from detection time of the anomalous first monitored data; and a first determination unit configured to, when the anomalous first monitored data is detected, retrieve the anomalous second monitored data associated with the detected anomalous first monitored data from the first storage unit and output a first anomaly detection result including the retrieved anomalous second monitored data and the detected anomalous first monitored data.

DESCRIPTION OF REFERENCE NUMERALS 100 anomaly detection device
101 collection unit
102 first learning unit
103 second learning unit
104 first model
105 second model
106 first anomaly detection unit
107 second anomaly detection unit
108 determination unit
109 storage unit
110 output unit
200 monitored system
201 device
202 sensor
203 log recording unit
210 sensor data
211 log data
221 time-series data of sensor with sensor ID=1
222 time-series data of sensor with sensor ID=2
223 time-series data of sensor with sensor ID=3
224 time-series data of sensor with sensor ID=4
225 time-series data of sensor with sensor ID=5
226 time-series data of sensor with sensor ID=6
300 anomaly detection device
301 collection unit
302 first learning unit
303 second learning unit
304 first model
305 second model
306 first anomaly detection unit
307 second anomaly detection unit
308 determination unit
309 storage unit
310 output unit
400 monitored system
401 device
402 sensor
403 log recording unit
410 sensor data
411 log data
500 anomaly detection device
501 collection unit
502 first learning unit
503 second learning unit
504 first model
505 second model
506 first anomaly detection unit
507 second anomaly detection unit
508-1 first determination unit
508-1 second determination unit
509-1 first storage unit
509-2 second storage unit
510 output unit
600 monitored system
601 device
602 sensor
603 log recording unit
610 sensor data
611 log data
700 anomaly detection device
701 first anomaly detection unit
702 second anomaly detection unit
703 first storage unit
704 first determination unit
800 monitored system
1000 information processing device
1001 communication interface unit
1002 operation input unit
1003 screen display unit
1004 storage unit
1005 arithmetic logic unit
1110 program

What is claimed is:

1. An anomaly detection device comprising:
a first memory containing program instructions; and
a processor coupled to the first memory, wherein the processor is configured to execute the program instructions to:
from each of a plurality of devices constituting a monitored system, regularly collect sensor data measured by a sensor provided to the device and log data of the device, one of the collected sensor data and the log data being first monitored data, another of the collected sensor data and the log data being second monitored data;
detect anomalous first monitored data from among a plurality of pieces of the first monitored data;
in parallel with detection of the anomalous first monitored data, detect anomalous second monitored data from among a plurality of pieces of the second monitored data;
when the anomalous first monitored data is detected, determine whether or not the anomalous second monitored data associated with the detected anomalous first monitored data is stored in a second memory;
in a case where the anomalous second monitored data associated with the detected anomalous first monitored data is not stored, store the detected anomalous first monitored data into the second memory, and when the anomalous second monitored data is detected before lapse of a given time from detection time of the anomalous first monitored data, store the detected anomalous second monitored data into the second memory in association with the stored anomalous first monitored data; and
in a case where the anomalous second monitored data associated with the detected anomalous first monitored data is stored, retrieve the anomalous second monitored data associated with the detected anomalous first monitored data from the second memory and output a first anomaly detection result including the retrieved anomalous second monitored data and the detected anomalous first monitored data.

2. The anomaly detection device according to claim 1, wherein the processor is further configured to execute the instructions to, when the anomalous first monitored data is detected, in a case where the anomalous second monitored data associated with the detected anomalous first monitored data is not stored in the second memory, output a second anomaly detection result including the detected anomalous first monitored data.

3. The anomaly detection device according to claim 1, further comprising:
a third memory configured to have the anomalous second monitored data and the anomalous first monitored data stored therein in association with each other, the anomalous first monitored data having been detected before lapse of a given time from detection time of the anomalous second monitored data, wherein the processor is further configured to execute the instructions to, when the anomalous second monitored data is detected, retrieve the anomalous first monitored data associated with the detected anomalous second monitored data from the third memory and output a third anomaly detection result including the retrieved anomalous first monitored data and the detected anomalous second monitored data.

4. The anomaly detection device according to claim 3, wherein the processor is further configured to execute the instructions to, when the anomalous second monitored data is detected, in a case where the anomalous first monitored data associated with the detected anomalous second monitored data is not stored in the third memory, store the detected anomalous second monitored data into the third memory and, when the anomalous first monitored data is detected before lapse of a given time from detection time of the anomalous second monitored data, store the detected anomalous first monitored data into the third memory in association with the stored anomalous second monitored data.

5. The anomaly detection device according to claim 3, wherein the processor is further configured to execute the instructions to, when the anomalous second monitored data is detected, in a case where the anomalous first monitored data associated with the detected anomalous second monitored data is not stored in the third memory, output a fourth anomaly detection result including the detected anomalous second monitored data.

6. An anomaly detection method comprising:
from each of a plurality of devices constituting a monitored system, regularly collecting sensor data measured by a sensor provided to the device and log data of the device, one of the collected sensor data and the log data being first monitored data, another of the collected sensor data and the log data being second monitored data;
detecting anomalous first monitored data from among a plurality of pieces of the first monitored data;
in parallel with detecting the anomalous first monitored data, detecting anomalous second monitored data from among a plurality of pieces of the second monitored data; and
when the anomalous first monitored data is detected,
determining whether or not the anomalous second monitored data associated with the detected anomalous first monitored data is stored in a first memory;
in a case where the anomalous second monitored data associated with the detected anomalous first monitored data is not stored, storing the detected anomalous first monitored data into the first memory, and when the anomalous second monitored data is detected before lapse of a given time from detection time of the anomalous first monitored data, storing the detected anomalous second monitored data into the first memory in association with the stored anomalous first monitored data; and in a case where the anomalous second monitored data associated with the detected anomalous first monitored data is stored, retrieving the anomalous second monitored data associated with the detected anomalous first monitored data from the first memory, and outputting a first anomaly detection result including the retrieved anomalous second monitored data and the detected anomalous first monitored data.

7. The anomaly detection method according to claim 6, comprising, when the anomalous first monitored data is detected, in a case where the anomalous second monitored data associated with the detected anomalous first monitored data is not stored in the first memory, outputting a second anomaly detection result including the detected anomalous first monitored data.

8. The anomaly detection method according to claim 6, comprising, when the anomalous second monitored data is detected, retrieving the anomalous first monitored data associated with the detected anomalous second monitored data from a second memory in which the anomalous second monitored data and the anomalous first monitored data having been detected before lapse of a given time from detection time of the anomalous second monitored data are stored in association with each other, and outputting a third anomaly detection result including the retrieved anomalous first monitored data and the detected anomalous second monitored data.

9. The anomaly detection method according to claim 8, comprising, when the anomalous second monitored data is detected, in a case where the anomalous first monitored data associated with the detected anomalous second monitored data is not stored in the second memory, storing the detected anomalous second monitored data into the second memory and, when the anomalous first monitored data is detected before lapse of a given time from detection time of the anomalous second monitored data, storing the detected anomalous first monitored data into the second memory in association with the stored anomalous second monitored data.

10. The anomaly detection method according to claim 8, comprising, when the anomalous second monitored data is detected, in a case where the anomalous first monitored data associated with the detected anomalous second monitored data is not stored in the second memory, outputting a fourth anomaly detection result including the detected anomalous second monitored data.

11. A non-transitory computer-readable recording medium having a program stored thereon, the program comprising instructions for causing a computer to execute the instructions to:
from each of a plurality of devices constituting a monitored system, regularly collect sensor data measured by a sensor provided to the device and log data of the device, one of the collected sensor data and the log data being first monitored data, another of the collected sensor data and the log data being second monitored data;
detect anomalous first monitored data from among a plurality of pieces of the first monitored data;
in parallel with detection of the anomalous first monitored data, detect anomalous second monitored data from among a plurality of pieces of the second monitored data;

when the anomalous first monitored data is detected, determine whether or not the anomalous second monitored data associated with the detected anomalous first monitored data is stored in a first memory;

in a case where the anomalous second monitored data associated with the detected anomalous first monitored data is not stored, store the detected anomalous first monitored data into the first memory, and when the anomalous second monitored data is detected before lapse of a given time from detection time of the anomalous first monitored data, store the detected anomalous second monitored data into the first memory in association with the stored anomalous first monitored data; and in a case where the anomalous second monitored data associated with the detected anomalous first monitored data is stored, retrieve the anomalous second monitored data associated with the detected anomalous first monitored data from the first memory, and output a first anomaly detection result including the retrieved anomalous second monitored data and the detected anomalous first monitored data.

* * * * *